United States Patent
Kwak et al.

(10) Patent No.: US 12,143,846 B2
(45) Date of Patent: *Nov. 12, 2024

(54) SUPPORT OF FLEXIBLE PDCCH MONITORING IN NEW RADIO (NR)

(71) Applicant: APPLE INC., Cupertino, CA (US)

(72) Inventors: Yongjun Kwak, Portland, OR (US); Gang Xiong, Portland, OR (US); Hong He, San Jose, CA (US); Yujian Zhang, Beijing (CN); Debdeep Chatterjee, San Jose, CA (US); Honglei Miao, Munich (DE); Bharat Shrestha, Hillsboro, OR (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/467,407

(22) Filed: Sep. 14, 2023

(65) Prior Publication Data

US 2023/0422067 A1 Dec. 28, 2023

Related U.S. Application Data

(60) Continuation of application No. 17/643,538, filed on Dec. 9, 2021, now Pat. No. 11,805,432, which is a
(Continued)

(51) Int. Cl.
*H04W 24/08* (2009.01)
*H04L 5/00* (2006.01)
(Continued)

(52) U.S. Cl.
CPC ........... *H04W 24/08* (2013.01); *H04L 5/0053* (2013.01); *H04L 5/0048* (2013.01); *H04L 5/0091* (2013.01);
(Continued)

(58) Field of Classification Search
CPC ................ H04L 5/0048; H04L 5/0053; H04L 5/0091; H04L 5/0094; H04W 24/08; H04W 52/0216; H04W 72/12
See application file for complete search history.

(56) References Cited

U.S. PATENT DOCUMENTS

| | | |
|---|---|---|
| 11,234,144 B2 | 1/2022 | Kwak et al. |
| 2013/0022014 A1 | 1/2013 | Hong et al. |

(Continued)

FOREIGN PATENT DOCUMENTS

| | | |
|---|---|---|
| CN | 102422586 A | 4/2012 |
| CN | 102625457 A | 8/2012 |

(Continued)

OTHER PUBLICATIONS

U.S. Appl. No. 16/462,644 , Supplemental Notice of Allowance, Dec. 23, 2021, 3 pages.
(Continued)

*Primary Examiner* — Zhensheng Zhang
(74) *Attorney, Agent, or Firm* — Dorsey & Whitney LLP

(57) ABSTRACT

Technology for a user equipment (UE), operable for monitoring a physical downlink control channel (PDCCH) is disclosed. The UE can monitor a downlink (DL) control channel for DL control information (DCI) at a predetermined monitoring occasion, wherein the predetermined monitoring occasion has a periodicity of P slots or P symbols with an offset $O_s$. The UE can monitor a downlink (DL) control channel for DL control information (DCI) at a predetermined monitoring occasion, wherein $O_s$ has an offset with respect to a first slot in subframe number zero (SFN #0). The UE can monitor a downlink (DL) control channel for DL control information (DCI) at a predetermined monitoring occasion, wherein P is a positive integer greater than zero.

18 Claims, 18 Drawing Sheets

Related U.S. Application Data division of application No. 16/462,644, filed as application No. PCT/US2018/031253 on May 4, 2018, now Pat. No. 11,234,144.

(60) Provisional application No. 62/505,529, filed on May 12, 2017, provisional application No. 62/502,509, filed on May 5, 2017.

(51) Int. Cl.
  *H04W 72/12* (2023.01)
  *H04W 76/28* (2018.01)
  *H04W 84/04* (2009.01)
  *H04W 88/02* (2009.01)

(52) U.S. Cl.
  CPC ............ *H04W 72/12* (2013.01); *H04W 76/28* (2018.02); *H04W 84/042* (2013.01); *H04W 88/02* (2013.01)

(56) References Cited

U.S. PATENT DOCUMENTS

| | | | |
|---|---|---|---|
| 2013/0100921 | A1 | 4/2013 | Nakao et al. |
| 2013/0195039 | A1 | 8/2013 | Pan et al. |
| 2015/0139123 | A1 | 5/2015 | McBeath et al. |
| 2015/0181574 | A1 | 6/2015 | Lee et al. |
| 2015/0304086 | A1 | 10/2015 | Kim et al. |
| 2016/0021658 | A1 | 1/2016 | Chen et al. |
| 2017/0094643 | A1 | 3/2017 | Park et al. |
| 2018/0206263 | A1 | 7/2018 | Lin |
| 2018/0219654 | A1 | 8/2018 | Chen et al. |

FOREIGN PATENT DOCUMENTS

| | | |
|---|---|---|
| CN | 101854718 B | 4/2015 |
| CN | 106489246 A | 3/2017 |
| EP | 2693677 A1 | 2/2014 |
| WO | 2010129606 A1 | 11/2010 |
| WO | 2016018469 A1 | 2/2016 |
| WO | 2016144075 A1 | 9/2016 |

OTHER PUBLICATIONS

U.S. Appl. No. 16/462,644 , Final Office Action, Jan. 7, 2021, 11 pages.

U.S. Appl. No. 16/462,644 , Non-Final Office Action, Jun. 25, 2021, 10 pages.

U.S. Appl. No. 16/462,644 , Notice of Allowance, Nov. 4, 2021, 6 pages.

U.S. Appl. No. 16/462,644 , Non-Final Office Action, Sep. 8, 2020, 9 pages.

U.S. Appl. No. 17/643,538 , Supplemental Notice of Allowability, Jul. 13, 2023, 2 pages.

U.S. Appl. No. 17/643,538 , Notice of Allowance, Jun. 30, 2023, 11 pages.

Huawei, HiSilicon , "Search space design", R1-1706944, 3GPP TSG RAN WG1 Meeting #89, Hangzhou, China, Agenda Item 7.1.3.1.2, May 15-19, 2017, 4 pages.

MCC Support , "Final Report 3GPP TSG RAN WG1 #AH1_NR v1.0.0 (Spokane, ISA, Jan. 16-20, 2017)", R1-1701553, 3GPP TSG RAN WG1 Meeting #88, Athens, Greece, Feb. 13-17, 2017, 106 pages.

MCC Support , "Final Report of 3GPP TSG RAN WG1 #86bis v1.0.0 (Lisbon, Portugal, Oct. 10-14, 2016(", R1-1611081, 3GPP TSG RAN WG1 Meeting #87, Reno, Nevada, USA, Nov. 14-18, 2016, 160 pages.

MCC Support , "Final Report of 3GPP TSG RAN WG1 #88bis V1.0.0 (Spokane, USA, Apr. 3-7, 2017)", R1-1708890, 3GPP TSG RAN WG1 Meeting #89, Hangzhou, China, May 15-19, 2017, 154 pages.

PCT/US2018/031253 , International Search Report and Written Opinion, Oct. 17, 2018, 17 pages.

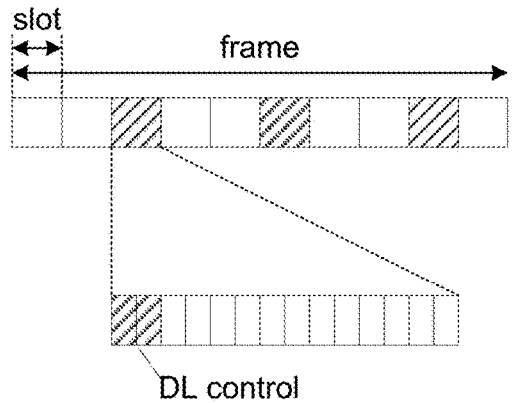
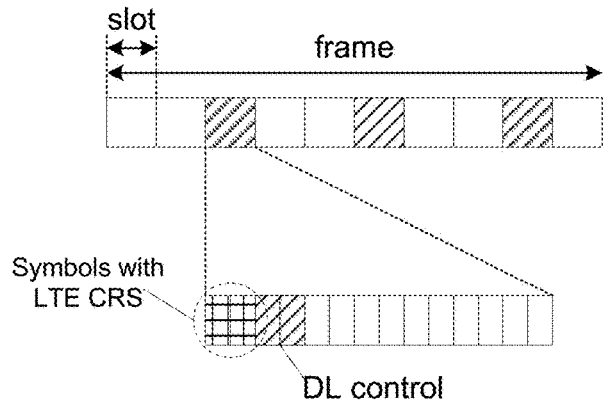
FIG. 3

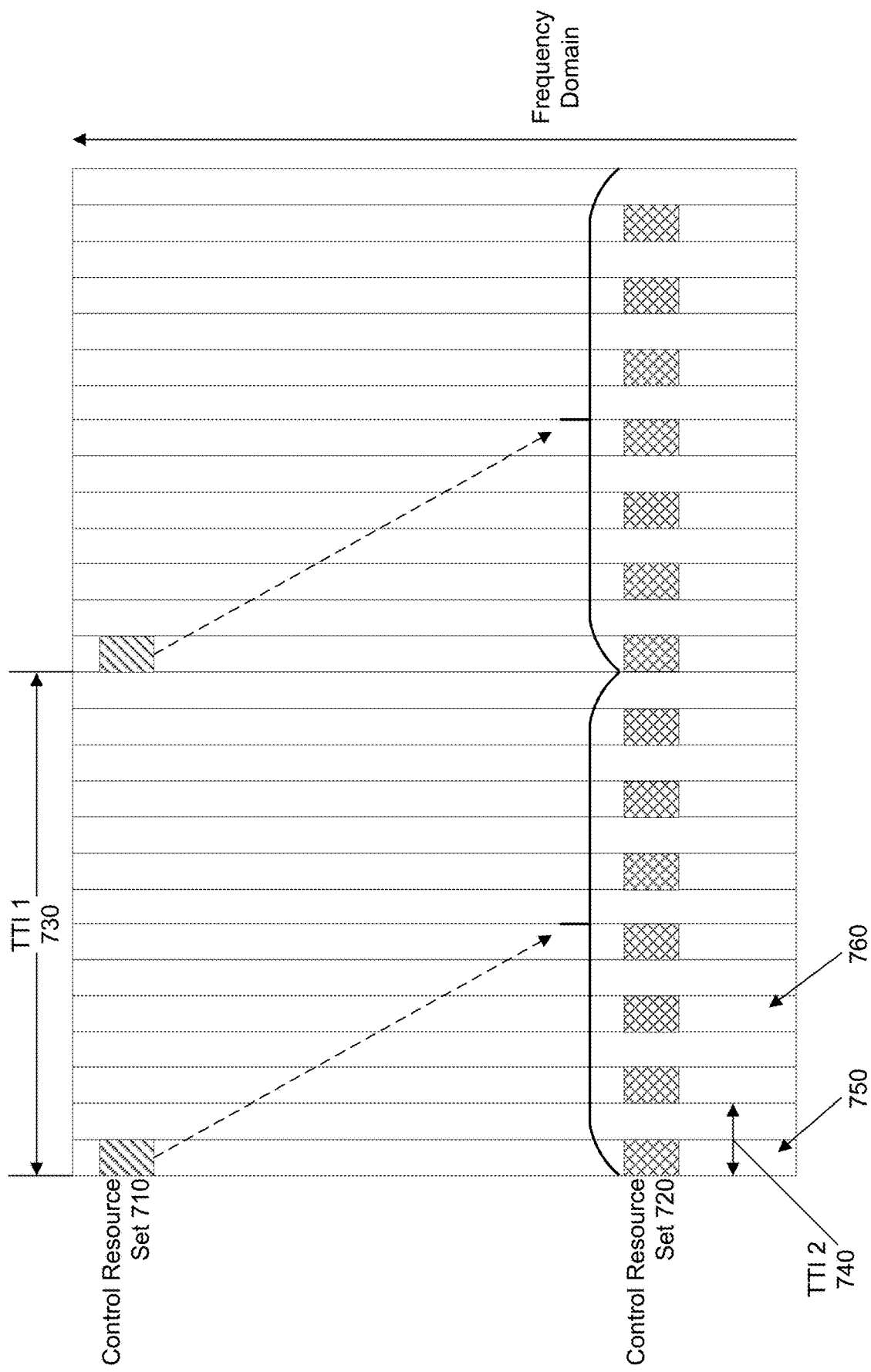

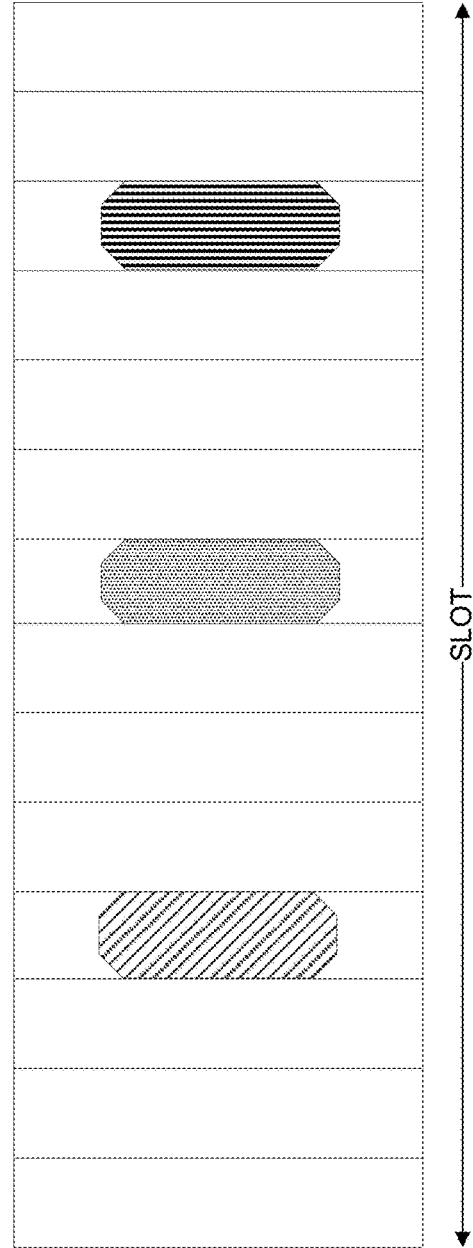
FIG. 8A
FIG. 8B

SUPPORT OF FLEXIBLE PDCCH MONITORING IN NEW RADIO (NR)

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3 illustrates an orthogonal frequency division multiplexing (OFDM) symbol position depending on the long term evolution new radio (LTE-NR) coexistence, in accordance with an example;

FIG. 7 illustrates an exemplified physical downlink control channel (PDCCH) structure to support multiplexing enhanced Mobile BroadBand (eMBB) and Ultra-Reliable and Low Latency Communications (URLLC) for a given user equipment (UE), in accordance with an example;

FIG. 8A illustrates a slot level control resource set (CORESET), in accordance with an example;

FIG. 8B illustrates a symbol level control resource set (CORESET), in accordance with an example;

Figure 1:
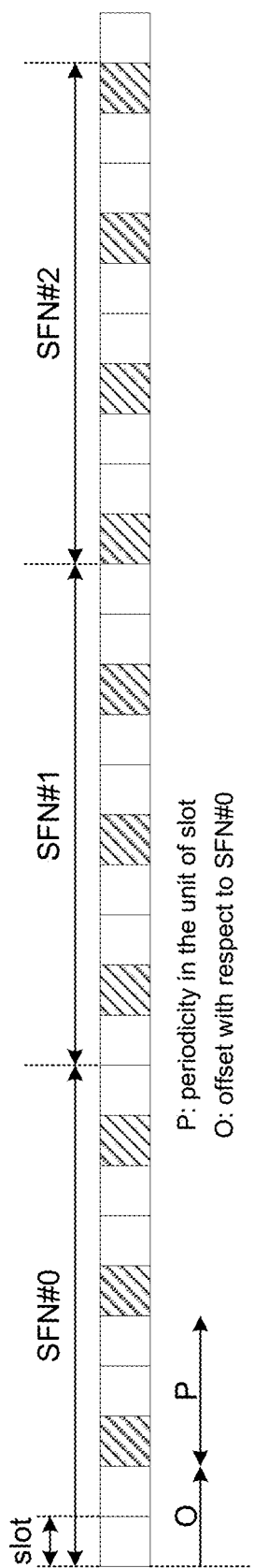
FIG. 1 illustrates a periodic configuration of slot level downlink (DL) control channel monitoring, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. Mechanisms are disclosed for configuration of downlink (DL) control channel monitoring occasions. Additionally, different options for defining UE behavior and handling of multiple DL control channel monitoring configurations from a single UE perspective are disclosed. The next generation wireless communication system, 5G, or new radio (NR) will provide access to information and sharing of data anywhere, at any time by various users and applications. NR is expected to be a unified network/system that is targeted to meet vastly different and sometime conflicting performance dimensions and services.

Such diverse multi-dimensional designs are driven by different services and applications. In general, NR will evolve based on 3GPP LTE-Advanced with additional potential new Radio Access Technologies (RATs) to enrich people lives with better, simple and seamless wireless connectivity solutions. NR will enable everything to be connected by wireless and deliver fast, rich contents and services.

In 3GPP LTE Release 8, search space (SS) is defined so as to allow the UE to monitor a certain number of blind decoding candidates for each aggregation level in each subframe. More specifically, the UE can perform multiple blind decodings within the search space for potential downlink control information DCI messages. For NR, a similar concept can be considered for the design of the search space. In particular, a common and a UE specific search space can be defined for NR, where a DL control channel with a common search space can be mainly used to schedule common control messages. The UE specific search space can be used to schedule unicast data for a specific UE.

As defined in NR, a control resource set, which is called a CORESET hereafter, is a set of resource element groups (REG) of resource elements within which the UE attempts to blindly decode downlink control information. Further, CORESET is defined as a set of REGs under a given numerology. The REGs may or may not be frequency contiguous. When the CORESET spans multiple OFDM symbols, a control channel candidate can be mapped to multiple OFDM symbols or to a single OFDM symbol. The gNB can inform the UE which control channel candidates are mapped to each subset of OFDM symbols in the CORESET.

At the 3rd Generation Partnership Project (3GPP) RAN1 meetings, several agreements were made with regard to NR downlink control channel monitoring occasions. It was agreed that UE-specific DL control information monitoring occasions at least in time domain can be configured. It was also agreed that blocking probability of DL control channel should be taken into account in new radio physical downlink control channel (NR-PDCCH) design. Additionally, there will be some support of NR DL in MBSFN subframes of LTE.

It has previously been determined that a UE can be configured to monitor a DL control channel in terms of a slot or an OFDM symbol with respect to the numerology of the DL control channel. Additionally, it has been determined that there can be occasions of DL control channel monitoring per 1 symbol with respect to the numerology of the DL control channel. It can be determined whether or not the total number of blind decodings in a slot, when a UE is configured with DL control channel monitoring, can exceed the total number of blind decodings in a slot when a UE is configured with "DL control channel monitoring" per slot.

Mechanisms to Configure Downlink (DL) Control Channel Monitoring

For configurations of the DL control channel monitoring occasions, it needs to be clarified how to differentiate between common control channels and UE-specific control channels. For information sent in a common control channel, such as a system information block (SIB) or a random access response (RAR) message, it is beneficial to configure common monitoring occasions between UEs in order to avoid the repeated transmissions of the same channels. For a UE-specific control channel and some of the control channel information, e.g., paging, the monitoring occasions can be configured for different UEs either similarly or differently depending on the network (NW). Therefore, a monitoring occasion related configuration can be associated with a search space configuration.

In one embodiment, for the configuration of DL control channel monitoring occasions, a periodic manner can be used. If the UE is configured with a certain periodicity, 'P', then the UE can monitor the DL control channel for P slots, where P is a positive integer greater than one.

FIG. 1 illustrates an example of a periodic configuration for slot level downlink (DL) control channel monitoring. In one embodiment, the reference point can be the start of the system frame number (SFN) #0. There can be an offset 'O' configured for multiplexing UEs in different slots, where $O=\{0, 1, 2, \ldots, P-1\}$.

Note that the slot illustrated in FIG. 1 may be defined according to a reference numerology or a numerology which is configured by higher layers. In one example, the numerology may be configured via a NR minimum system information (MSI), a NR remaining minimum system information (RMSI), a NR system information block (SIB), or using radio resource control (RRC) signalling.

In one example of a numerology, periodicity and offset for DL control channel monitoring occasions can be configured in accordance with a slot using 15 kHz subcarrier spacing for a carrier frequency below 6 GHz. In another example of a numerology, periodicity and offset for DL control channel monitoring occasions can be configured in accordance with a numerology configured for the DL control channel for 30 kilohertz (kHz), 60 kHz, and 120 kHz.

Figure 2:
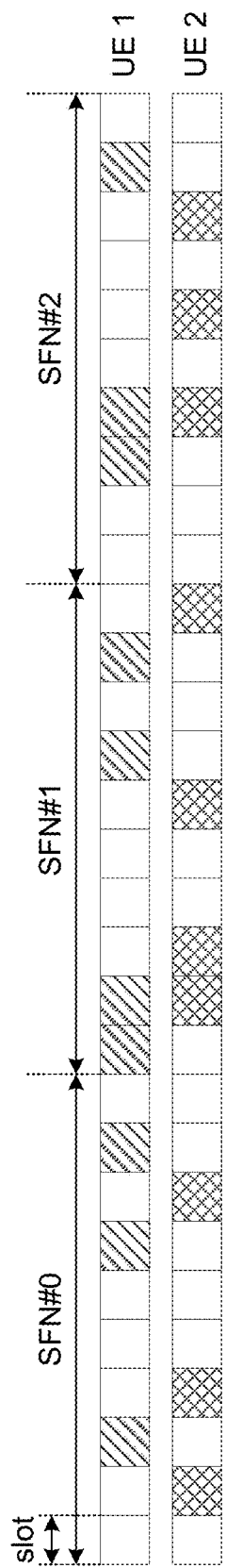
FIG. 2 illustrates a random configuration of slot level downlink (DL) control channel monitoring, in accordance with an example.

FIG. 2 illustrates a random configuration of slot level downlink (DL) control channel monitoring. In one embodiment randomized occasions can be considered. If the monitoring occasions are determined periodically and the periodicity and offset values of multiple UEs are the same, then it is possible that some UEs may not have a sufficient chance for the scheduling. Therefore, if the monitoring occasions are determined in a more randomized manner, it can be beneficial to reduce the scheduling blocking probability as shown in FIG. 2 especially for UE-specific search space. One potential way is to define a hashing function determining the actual slots that a UE has to monitor and the hashing function can be based on a UE ID for randomization and an additional configuration parameter for providing network (NW) control. For this approach, it should be taken into account that the gap between two consecutive monitoring slots should not be too large considering service a desired latency level for a selected numerology and/or system design.

As a further extension, the hashing function can be also based on a cell ID to randomize the monitoring occasion in different cells. The generalized hashing function can be M(UE_ID, High_layer_parameter1, . . . ). One possible hashing function is Slot #P of SFN #Q is monitored if $((Q \times 10+P) \times UE\_ID) \times High\_layer\_parameter1) \mod High\_layer\_parameter2=0$. In this example, the variables P and Q are positive integers.

Another possible hashing function is Slot #P of SFN #Q is monitored if $((Q \times 10+P) \times UE\ ID) \mod High\_layer\_parameter1) \mod High\_layer\_parameter2=0$. There can be many other forms of hashing function that can use at least a certain form of the UE_ID for randomization between UEs.

FIG. 3 illustrates an orthogonal frequency division multiplexing (OFDM) symbol position depending on the long term evolution new radio (LTE-NR) coexistence. In one embodiment, LTE-NR coexistence can be considered. In one example, NR can support the transmissions of NR DL in multicast-broadcast single frequency network (MBSFN) subframes of LTE for the realization of LTE-NR coexistence. Therefore, for the control channel monitoring behavior, an LTE and MBSFN subframe can be considered together. As shown in FIG. 3, there can be additional symbol level offsets for the control channel monitoring when LTE-NR coexistence is configured. When LTE-NR coexistence is taken into account, using the MBSFN approach, symbols with LTE cell-specific reference signals (CRS) can be transmitted in the first symbol or two symbols of a subframe. The additional symbol level offsets can be used to compensate for the LTE CRS transmissions.

In another embodiment, the monitoring occasions for monitoring for PDCCH in the CSS in a common CORESET is only defined with a minimum monitoring period of one slot. Further, in another embodiment, the UE may be expected to monitor the common CORESET only at the beginning of a slot. For example, common CORESETs may not be configured on OFDM symbols occurring later in the slot and with a minimum period between monitoring occasions of 1 slot duration.

Figure 4:
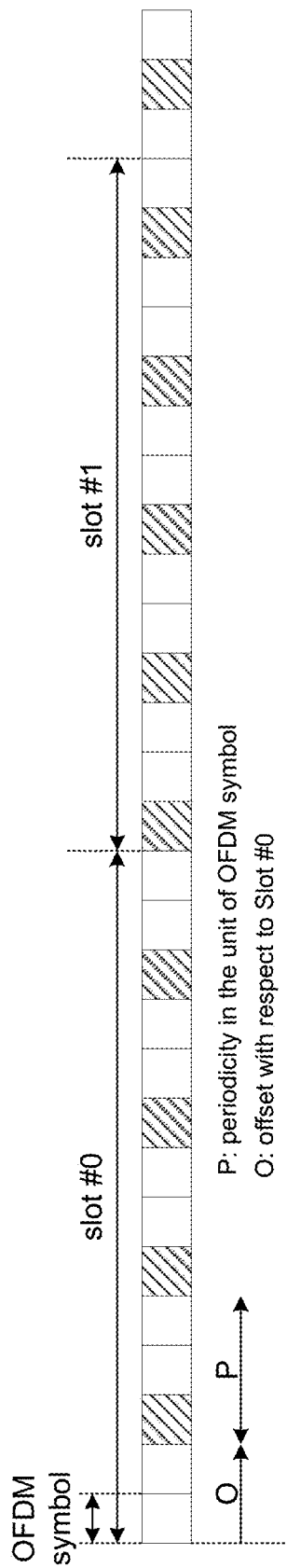
FIG. 4 illustrates a periodic configuration of symbol level downlink (DL) control channel monitoring assuming 14 OFDM symbols per slot, in accordance with an example.

FIG. 4 illustrates a periodic configuration of symbol level downlink (DL) control channel monitoring assuming 14 OFDM symbols per slot. In one embodiment, for the configuration of DL control channel monitoring occasions in every symbol or multiple symbols, a periodic manner can be used. If the UE is configured with a certain periodicity 'P', then the UE can monitor the DL control channel every P symbols. The example of FIG. 4 is illustrating the periodic configuration of the symbol level DL control channel monitoring. The reference point can be the start of the radio frame or possibly the start of the SFN #0. There can be an offset 'O' that is configured for multiplexing UEs in different symbols, where O={0, 1, 2, . . . , 13}. And P can be one of {1, 2, 3, . . . , 7}.

Note that the symbol duration here may be defined according to a reference numerology. The numerology can be configured by higher layers via a NR minimum system information (MSI), a NR remaining minimum system information (RMSI), a NR system information block (SIB) or radio resource control (RRC) signaling. Further, note that "symbol-level DL control channel monitoring" may also be referred to as "mini-slot-level DL control channel monitoring" or "symbol-group-level DL control channel monitoring".

Figure 5:
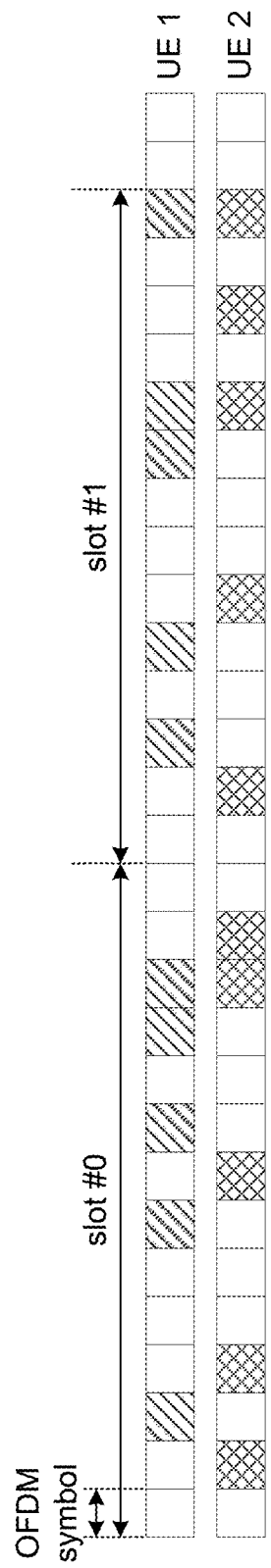
FIG. 5 illustrates a random configuration of symbol level downlink (DL) control channel monitoring, in accordance with an example.

FIG. 5 illustrates a random configuration of symbol level downlink (DL) control channel monitoring. In one embodiment, a randomized occasion can be considered. If the monitoring occasions are determined periodically and the periodicity and offset values of multiple UEs are the same, then it is possible that some UEs may not have a sufficient chance for the scheduling. Therefore, if the monitoring occasions are determined in a more randomized manner, it can be beneficial to reduce the scheduling blocking probability as shown in FIG. 5 especially for the UE-specific search space. One potential way is to define a hashing function determining the actual symbols that a UE has to monitor and the hashing function can be based on the UE ID for randomization and additional configuration parameter for providing NW control. For this approach, it should be taken into account that the gap between two consecutive monitoring symbols should not be too large considering service latency levels, as previously discussed.

In yet another embodiment, the UE may be configured with a number of monitoring occasions within a slot duration for monitoring of the PDCCH in the UE-specific search space (USS). The exact symbols or symbol groups (e.g., in the case of the CORESET, symbol groups can span multiple symbols) that the UE should monitor can be determined using a hashing function over the set of available symbols within a slot. The set of available symbols can be defined as a function of the UE-ID, such as a cell radio network temporary identifier (C-RNTI) for a specific UE. The set of candidates in a slot may be pre-defined in the specifications, or, configured via higher layers in a cell-specific or UE-specific manner.

In one embodiment, the set of candidates in a slot may be defined by excluding certain OFDM symbols. For example, symbols that can be excluded can include, e.g., a first symbol, a last symbol, or any symbol with DM-RS for PDSCH demodulation. In another embodiment, the set of candidate symbols may include all symbols in a slot.

As a further extension, the above hashing functions can be also based on a cell ID that can be used to randomize the monitoring occasion in different cells. The generalized hashing function can be M(UE_ID, High_layer_parameter1, . . . ). One possible hashing function is symbol #P of slot #Q is monitored if $((Q \times 14+P) \times UE\_ID) \times High\_layer\_parameter1)$ mod $High\_layer\_parameter2=0$. The variables P and Q can be positive integers.

Another possible hashing function is symbol #P of slot #Q is monitored if $((Q \times 14+P) \times UE\_ID)$ mod $High\_layer\_parameter1)$ mod $High\_layer\_parameter2=0$. There could be many other forms of hashing function but it can use at least a certain form of the UE_ID for randomization between UEs.

Figure 6:
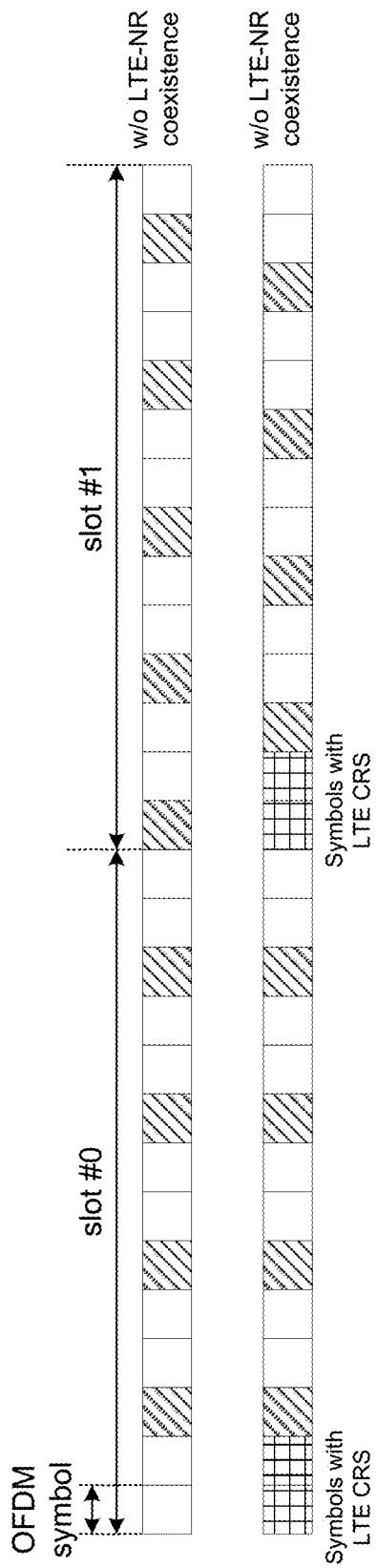
FIG. 6 illustrates a symbol level control channel monitoring in LTE Multicast-broadcast single-frequency network (MBSFN) subframe, in accordance with an example.

FIG. 6 illustrates a symbol level control channel monitoring in LTE Multicast-broadcast single-frequency network (MBSFN) subframe. In one embodiment, DL control channel monitoring in the LTE MBSFN subframe can be also considered for symbol level monitoring. In this case, the first two symbols in each slot are considered as invalid and only 12 symbols are considered for the DL control channel monitoring, assuming normal CP length as shown in FIG. 6. The first two symbols may include LTE CRS, as previously discussed. Either a periodic approach or a randomized approach can be used in this case. Alternatively, all the symbols in one slot can be counted considered for symbol level monitoring.

In another embodiment, monitoring occasions that occur with a period that is shorter than a slot duration may only be configured for UE-specific search spaces (USS), subsequent to an indication from the UE for support of such capability or implicitly determined based on the reported UE category. In the case of multi-symbol CORESETs, the monitoring occasions and their periods, etc., can be defined with respect to the first symbol of the CORESET.

Support of Multiple Downlink (DL) Control Channel Monitoring Configurations

In this section, the scenario is considered wherein a UE may need to be configured to monitor a DL control channel with different periodicities corresponding to different Quality of Service (QoS) demands from different applications and their generated traffic. Accordingly, several embodiments can consider that there are periodically occurring DL control channel monitoring occasions. As a simple example, there can be the case for a UE supporting both eMBB and URLLC applications with varied needs in terms of latency targets for each numerology.

Thus, in one embodiment, the UE can be configured with multiple DL control channel monitoring occasions for its USS monitoring, e.g., typically for unicast scheduling of DL/UL data. For such cases, different approaches may be taken to define the overall configuration and related UE behaviour. In the first alternative (Alt 1), the multiple DL control channel monitoring occasions can be automatically combined into a single search space with a mix of monitoring occasion periodicities. In the second alternative (Alt 2), different UE-specific search spaces (USS) are defined. These USS may be monitored using different Radio Network Temporary Identifiers (RNTI), e.g., each USS using a separate control RNTI (C-RNTI), using a single RNTI, e.g., or a C-RNTI for all instances. In the third alternative (Alt-3), only the more frequent search space monitoring configuration applies (single RNTI, e.g., C-RNTI is used). In this case, the assumption is that the monitoring configuration with larger periodicity includes occasions that are a subset of those monitoring occasions with smaller periodicity. Thus, once a UE is configured with a smaller monitoring periodicity, i.e., symbol/mini-slot-level monitoring for DL control channel, the smaller periodicity value overrides the earlier, e.g., slot-level monitoring behavior.

While the different USS instances are explicitly separated in Alt 2, for Alt 1 and Alt 3, the UE may be expected to monitor for a different number of Blind Decoding (BD) candidates in different monitoring instances. Specifically, per Alt 1 or Alt 3, the UE may be configured to monitor the USS in a common or UE-specific CORESET comprising of $N_1$ candidates once every slot, and the USS in a UE-specific CORESET comprising of $N_2$ candidates, with $N_2 <= N_1$. Such approaches may be essential towards ensuring a limited impact on device power consumption and complexity from PDCCH monitoring.

In one embodiment, the UE may only be configured with a USS with a DL control channel monitoring period of a one slot duration, and subsequently, may be configured with a USS with more frequent monitoring occasions (but reduced number of BD candidates in each of the new monitoring occasions). Once the latter configuration takes effect, the UE may reduce the number of BD attempts even in the originally configured USS within a CORESET occurring with a periodicity of a slot duration or more. The reduction in the number of BD candidates may be realized via the elimination of PDCCH candidates that may be indicated by the gNB using higher layer UE-specific signalling (radio resource control (RRC) or medium access control (MAC) control element (CE)).

In another embodiment, only a single USS and associated periodicity for DL control monitoring may be configured to a UE and it is up to the gNB implementation to ensure that the UE is configured with the appropriate monitoring occasion periodicity to ensure the desired QoS can be satisfied. In one example, the gNB can use MAC CE signalling to configure and update the USS configuration including the candidates to monitor at different monitoring instances to enable the support of frequent DL control channel monitoring without incurring a high penalty in terms of power consumption and device complexity.

Irrespective of whether multiple configurations for USS monitoring are used or not, in one embodiment, similar to the number of candidates, the CORESET configurations may be different for monitoring occasions for slot-level monitoring and symbol-level monitoring with monitoring periodicity less than a slot duration. This may also include different CORESETs being mapped to different BW parts (BWP) to be monitored at different monitoring occasions. For instance, a UE with URLLC traffic and stringent latency demands can be configured with a USS monitoring configuration such that the UE monitors a CORESET in BW part A for a certain set of PDCCH candidates with a slot-level periodicity, and monitor a CORESET in BW part B for a certain set of PDCCH candidates with a monitoring periodicity in terms of symbols/groups of symbols (but less than a slot duration). Note that BW parts A and B may be completely non-overlapping, may partly overlap, or overlap such that one BW part completely includes the other (e.g., BW part B may span the entire carrier BW). In another embodiment, as described above, the same CORESET is monitored at all monitoring instances, but with a different number of BD candidates.

In one embodiment, the UE configured with PDCCH monitoring at symbol-/symbol-group/mini-slot level is not expected to monitor for PDCCH in the occasions within the slot that overlap with an already assigned PDSCH reception. In other words, in case of any time domain conflicts between PDCCH monitoring occasions and reception of a dynamically scheduled PDSCH, the latter is prioritized and the UE is not expected to monitor PDCCH in the affected symbols. However, in case Semi Persistent Scheduling (SPS) based PDSCH reception (if supported in NR), the UE may be configured to prioritize either PDCCH monitoring or PDSCH reception. In yet another embodiment, the UE may be expected to simultaneously monitor for PDCCH as well as receive PDSCH as long as the CORESET for PDCCH monitoring does not overlap with the allocated PDSCH resources in frequency dimension and both fall within the supported maximum BW capability of the UE.

Certain aspects of the present disclosure provide a method for new radio wireless communication to efficiently support a more diverse set of serving at least including Enhance Mobile Broadband (eMBB) and Ultra-reliable low latency communications (URLLC) services. The method generally includes configuring, for each service, one search space comprising a set of resource block groups (RBGs) in frequency and periodicity in terms of TTI (e.g. slots or symbols) in time domain based on at least the latency level of the respective service.

FIG. 7 illustrates an exemplified physical downlink control channel (PDCCH) structure to support multiplexing enhanced Mobile BroadBand (eMBB) and Ultra-Reliable and Low Latency Communications (URLLC) for a given user equipment (UE). FIG. 7 illustrates an example block diagram 700 of PDCCH structures in accordance with various aspects of the present disclosure. Referring to FIG. 7, the DL data transmission may include both URLLC traffic and burst mode eMBB transmission for a given UE. In some design, a shorter transmission time interval (TTI) duration (TTI 2, 740) may be configured for PDCCH monitoring within the control resource set 710 for URLLC traffic in order to meet the stringent latency hybrid automatic repeat request (HARQ) and scheduling delay amount. While a longer TTI duration (TTI 1, 730) may be configured for PDCCH monitoring within the control resource set 720 for eMBB traffic.

In some designs, one field in the downlink control information (DCI) transmitted in PDCCH in the control resource set 710 may indicate the presence of PDCCH in the control resource set (CORESET) 720 within a window. In other words, TTI 1 730 can be configured to facilitate the blind decoding operation at the UE to minimize the power consumption. The UE can further conduct blind decoding attempts on the candidates of a control resource source unless it receives a predefined value in PDCCH transmitted in the control resource set 710 to indicate that there is no PDCCH transmission in the CORESET 720 within TTI 1 730. In addition, some other information to reduce the blind decoding efforts on the CORESET 720 may be also included in PDCCH transmitted in the control resource set 710, such as the aggregation level, the payload size, or the selected control resource set if multiple resource sets are configured with TTI 2 740, or a combination of these.

According to certain aspects, the UE may report its blind decoding capabilities as part of the UE capability either per UE, per service type, or per TTI length for monitoring. To limit the signalling overhead, a reference number of blind decoding may be defined as 'Z' and the number of blind decodes supported by the UE is the field value of UE capability *Z. For the symbol 750 where the UE needs to monitor both of these two control resource sets (CORE-SETS) 710 and 720, the splitting of blind decoding attempts between these two control resource sets may be configured by the gNB through higher layer signaling in accordance with the reported UE capability. It is also applied, that varied blind decoding attempts on the control resource set 720 may be conducted by the UE depending on the presence of another control resource set 710. For instance, a larger number of blind decoding attempt is applied on control resource set 720 in TTI 2 760 compared to that of TTI 2 750 due to limited UE processing capability.

FIG. 8A illustrates a slot level control resource set (CORESET), and FIG. 8B illustrates a symbol level control resource set (CORESET). According to the 3GPP Agreement, the UE may be configured with a symbol level or slot level CORESET with a certain offset/periodicity in one slot for DL control channel monitoring occasions. As illustrated in FIG. 8A and FIG. 8B, the UE can be configured with a slot level CORESET or a symbol level CORESET, which may depend on UE capability or service type, e.g., the support of eMBB and URLLC application.

Note that in the 3GPP LTE Rel. 8 specification, discontinuous reception (DRX) was defined, with the motivation of UE power consumption reduction. In particular, the UE is configured with a DRX cycle, where UE monitors only one physical downlink control channel (PDCCH) signaling in one subframe per DRX cycle. If there is no signaling detected within the subframes, the UE turns off the receiver circuitry and goes back to sleep. This mechanism can allow for a significant UE power consumption reduction.

For NR, a similar DRX mechanism can be considered for PDCCH monitoring. More specifically, UE can wake up in one slot for the monitoring of DL control channel per DRX cycle. However, given that the UE may be configured with multiple DL control channel monitoring occasions within one slot as mentioned above, it may be desirable to limit the DL control channel monitoring in the first few symbols in order to further reduce the UE power consumption. Accordingly, it is proposed that there can be a signaling mechanism and DL control channel monitoring configuration for DRX operation. In particular, it is proposed that the DL control channel monitoring configuration for DRX, and a signaling mechanism to indicate a subset of the search space.

Downlink (DL) Control Channel Monitoring Configuration for DRX

As mentioned above, per DRX cycle, the UE can wake up in one slot for the monitoring of a DL control channel. However, given that the UE may be configured with symbol level CORESET for DL control channel monitoring within one slot, it may be desirable to limit the DL control channel monitoring in the first few symbols in order to further reduce the UE power consumption.

In one embodiment, separate PDCCH monitoring configurations can be configured for RRC_CONNECTED, RRC_IDLE and/or INACTIVE mode for a given UE, respectively. In one example, for the PDCCH monitoring configuration in RRC_IDLE mode, the UE can be configured to monitor the PDCCH in a first K symbols within a limited bandwidth in order to reduce the UE power consumption. In another example, for RRC_IDLE mode, the UE is configured to monitor the search space within only one CORESET in one slot within DRX cycle which spans the first K symbols. Note that the K value can be predefined in the specification or configured by higher layers via the NR minimum system information (MSI), the NR remaining minimum system information (RMSI), the NR system information block (SIB) or the radio resource control (RRC) signaling.

In another embodiment, in case when the UE monitors the PDCCH in each DRX cycle, the UE only monitors a configured CORESET that occurs within the first K symbols in a slot. Further, UE can skip the monitoring of the PDCCH in the remaining slot, irrespective of additional PDCCH monitoring occasions that the UE may be configured to monitor at a "mini-slot"-level or symbol-level. Similarly, a K value can be predefined in the specification. For example, K can be a positive integer, such as K=3, or configured by higher layers via NR MSI, RMSI, NR SIB or RRC signaling.

Figure 9:
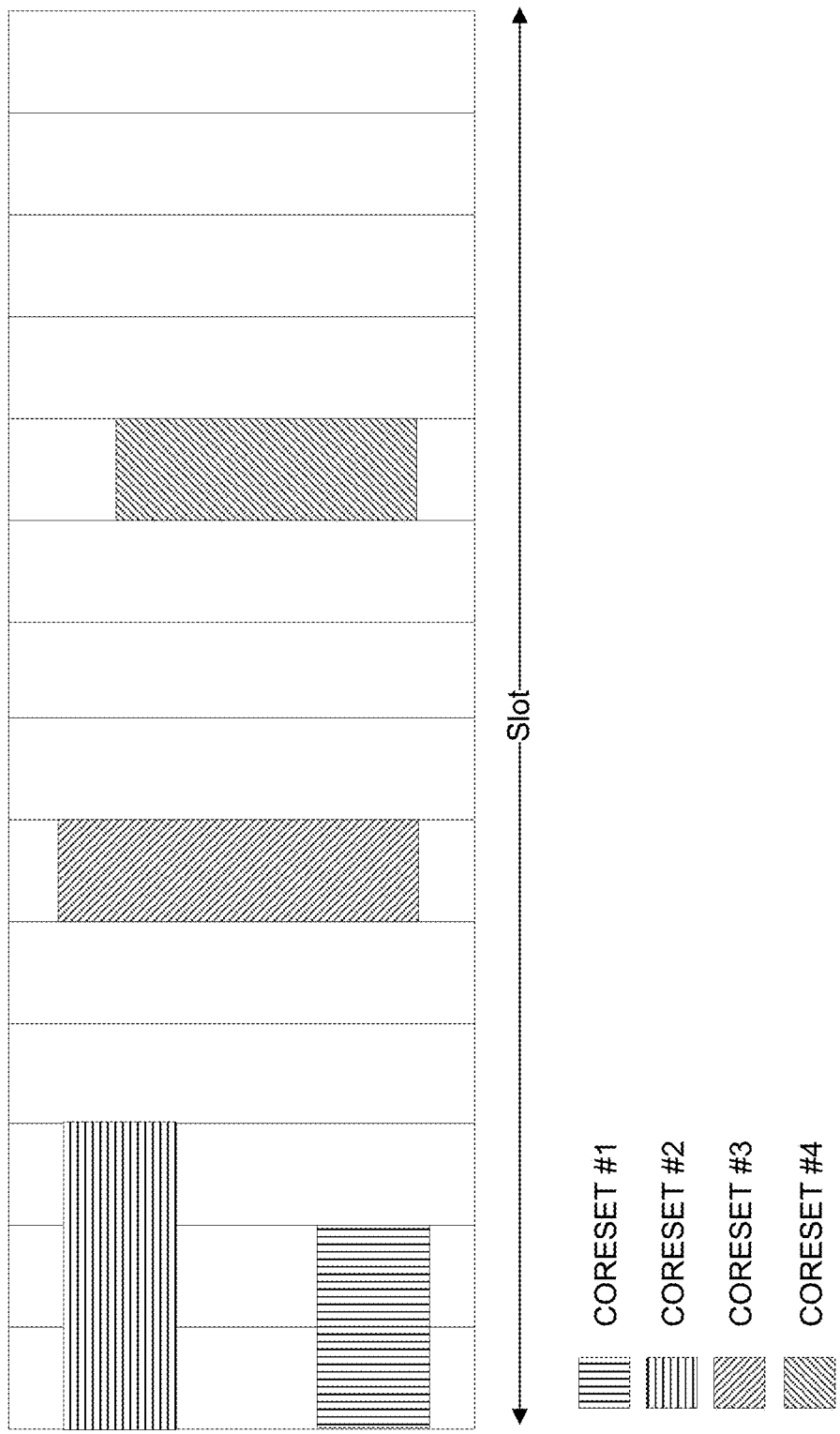
FIG. 9 illustrates a physical downlink control channel (PDCCH) monitoring occasions in one slot, in accordance with an example.

FIG. 9 illustrates a physical downlink control channel (PDCCH) monitoring occasions in one slot. FIG. 9 further illustrates one example of PDCCH monitoring occasions in one slot. With DRX cycle, the UE only monitors the PDCCH in CORESET #1 and #2 as these two CORESETS span the first 3 symbols. Further, the UE may skip the PDCCH monitoring in the CORESET #3 and #4 in the same slot.

In another embodiment, the common CORESET is configured only in the slot-level, and the symbol-level CORESET is configured only for the UE-specific CORESET. In RRC_IDLE mode, the UE only receives the common CORESET configuration with a DRX cycle so this UE only receives the slot level CORESET, where the slot-level CORESET is configured in the first K symbols of a slot, and the common CORESET is configured by a physical broadcast channel (PBCH) or system information. The RRC_CONNECTED UE can have a UE-specific CORESET and it can be configured to monitor symbol-level CORESET(s) that may be configured one or more times within a slot.

Signaling Mechanism to Indicate a Subset of Search Space

As mentioned above, a slot or symbol level CORESET can be configured for DL control channel monitoring. To minimize specification and implementation effort, it is beneficial to define a unified search space regardless of the slot or the symbol level CORESET, including the supported aggregation levels, and the number of blind decoding in each aggregation level.

In an embodiment, the search space configuration for the USS monitored at the symbol-level is derived from the configuration of the slot-level USS, while the CORESET configuration and configuration of monitoring occasions are signaled to the UE separately via higher layer signaling.

Alternatively, for the split of the number of blind decoding attempts among slot or symbol level CORESET, a subset of the UE specific search space can be configured for the UE to monitor potential DCI messages. More specifically, the gNB may configure a smaller number of candidates per aggregation level or configure a subset of aggregation levels.

Note that the subset of the search space can be dynamically indicated in the downlink control information (DCI) or a group common PDCCH or configured via a medium access control—control element (MAC-CE) or RRC signaling.

Embodiments of a signaling mechanism to indicate a subset of a search space of the slot-level USS for PDCCH monitoring at symbol-level are being provided as follows, in the following paragraphs.

In one embodiment, a bitmap can be used to indicate which subset of the search space is configured. In particular, bit "1" in the bitmap can be used to indicate that the blind decoding candidate in each aggregation level is configured, while bit "0" in the bitmap can be used to indicate that the blind decoding candidate in each aggregation level is not configured, respectively.

Figure 10:
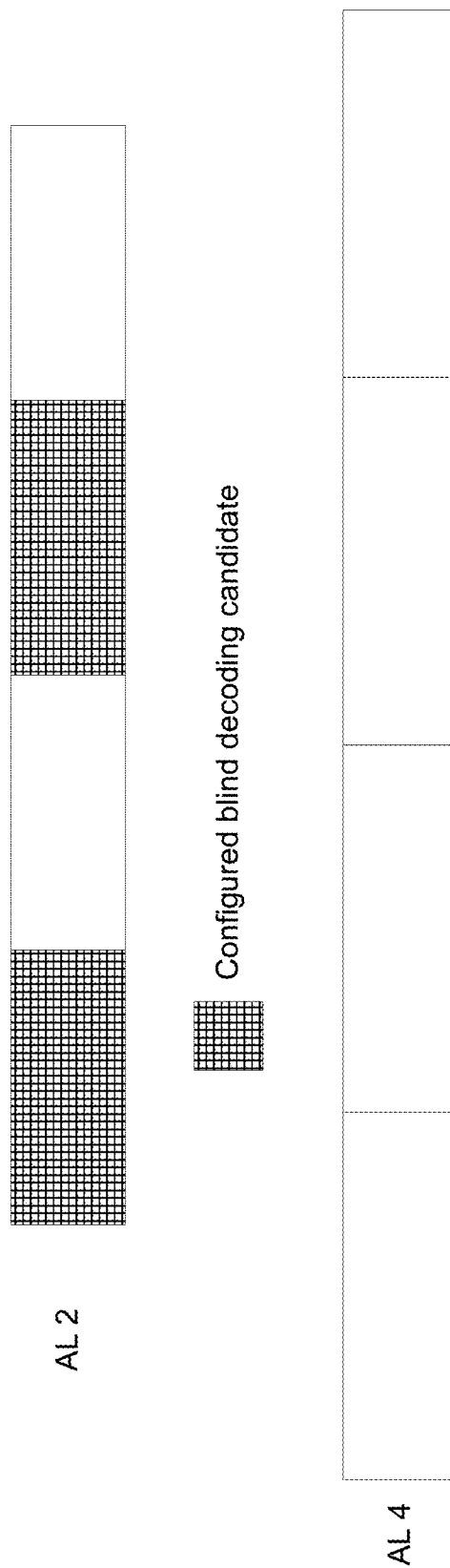
FIG. 10 illustrates a bitmap for indication of subset of search space, in accordance with an example.

One example of this is shown in FIG. 10 which illustrates a bitmap for indication of a subset of a search space. In one example, as shown in FIG. 10, assuming 2 Aggregation Levels (ALs) {AL #2, #4} and the number of blind decodings for each aggregation level (AL) is {4, 4}, a bitmap "10100000" can be used to indicate the first and third blind decoding candidate under AL #2 is configured for the UE to search. Note that although FIG. 10 illustrates an example in which the search space for different ALs is consecutive; the same design can apply for the case when search space is not consecutive.

In another embodiment, a scaling factor can be used to indicate which part of the search space is configured. In one example, a one bit indicator can be used to indicate 50% and 100% of the search space, where bit "1" indicates 100% of the search space is configured while bit "0" indicates 50% of the search space is configured. In the case when part of the search space is configured, the position of the search space or a blind decoding candidate in each aggregation level can be predefined in the specification. Additionally, the PDCCH candidates can correspond to the first x% of the originally configured search space, or configured by higher layers via NR MSI, RMSI, NR SIB or RRC signaling.

Figure 11:
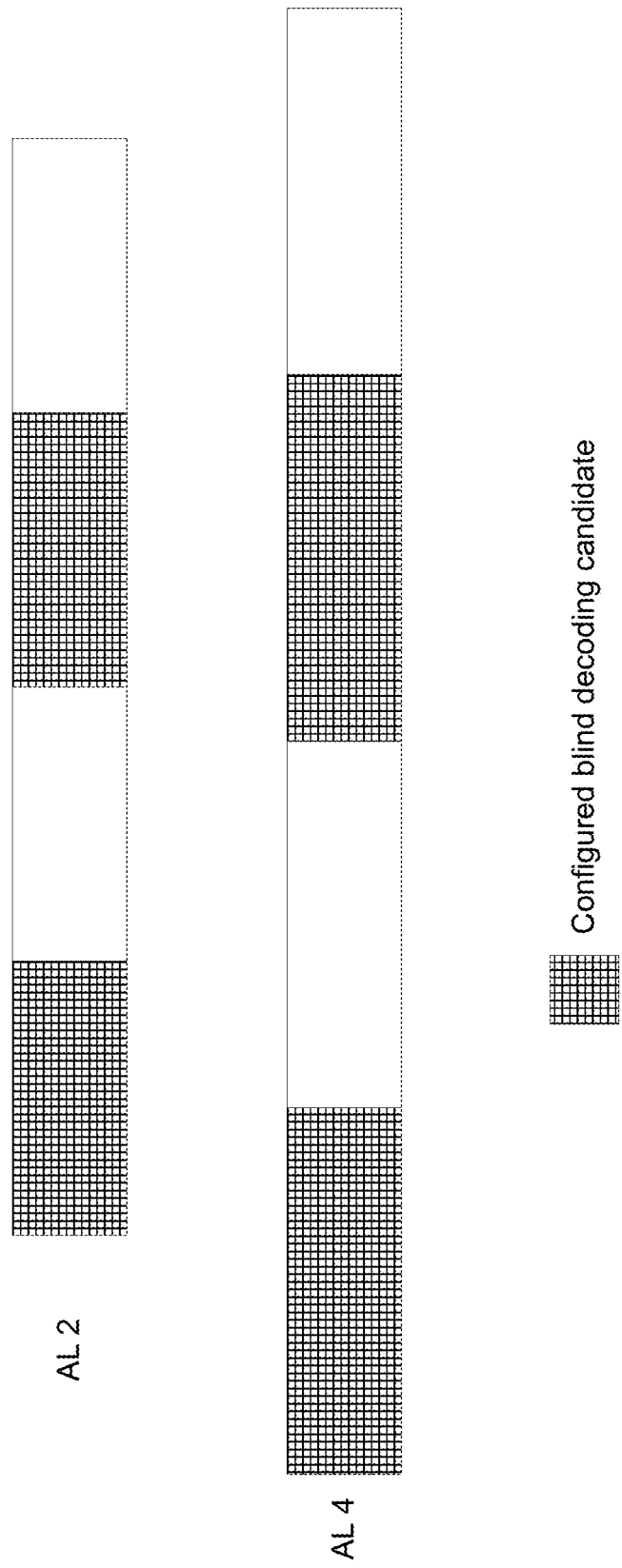
FIG. 11 illustrates a scaling factor for the indication of the subset of search space (SS), in accordance with an example.

In one example, an additional indicator can be used to indicate whether the first half or second half of the search space is configured. In another example, it can be configured that an even or odd subset of the search space is configured. As shown in FIG. 11 which illustrates a scaling factor for indication of the subset of the search space (SS), even a blind decoding candidate is configured for each AL when scaling factor=50%.

In another embodiment, given that search space can be defined as the supported aggregation levels and the number of blind decodings in each aggregation level (AL), a combination of a bitmap and a scaling factor can be used to indicate which part of search space is configured.

In one example, assuming 4 ALs {AL #2, #4, #8 and #16} and the number of blind decodings for each AL is {6, 6, 2, 2}, in this case, a bitmap "1010" can be used to indicate that AL #2 and #8 are configured while AL #4 and #16 are not configured for the search space. Further, a scaling factor can be used to indicate which part of the search space for each AL is configured. For instance, bit "0" is used to indicate that first half of search space for AL #2 and #8 is configured. In this case, the number of blind decodings for AL #2 and #8 is reduced to 3 and 1, respectively.

In another embodiment, the blind decoding of each subset of search spaces can be defined implicitly based on the number of subsets inside one slot. If the number of search space subsets to be monitored is large, the number of blind decodings can be scaled down per each search space subset in order to keep the number of blind decodings per slot.

In one example, the following equations can be configured for the search space determination. The set of PDCCH candidates to monitor are defined in terms of search spaces, where a search space $S_k^{(L)}$ at aggregation level $L \in \{1, 2, 4, 8\}$ is defined by a set of PDCCH candidates. The control channel elements (CCEs) corresponding to PDCCH candidate m of the search space $S_k^{(L)}$ are given by $$L \cdot \{(Y_k+m) \bmod \lfloor N_{CCE,k}/L \rfloor\}+i$$

where $Y_k$ is defined as a starting CCE for k number of slots where k>0, i=0, L, L−1 and m=0, L, $M^{(L)}$−1. $M^{(L)}$ is the number of PDCCH candidates to monitor in the given search space. If there are multiple search space subsets inside one search space, $M^{(L)}$ can be defined as floor($M^{(L)}$/P) for each search space subsets, where P is the number of search space subsets inside a slot. There can be a weighting factor for each search space subset, e.g., different P values for each search space subsets and the P values can be configured. Another example is that $M^{(L)}$ can be configured per each search space subset.

Figure 12:
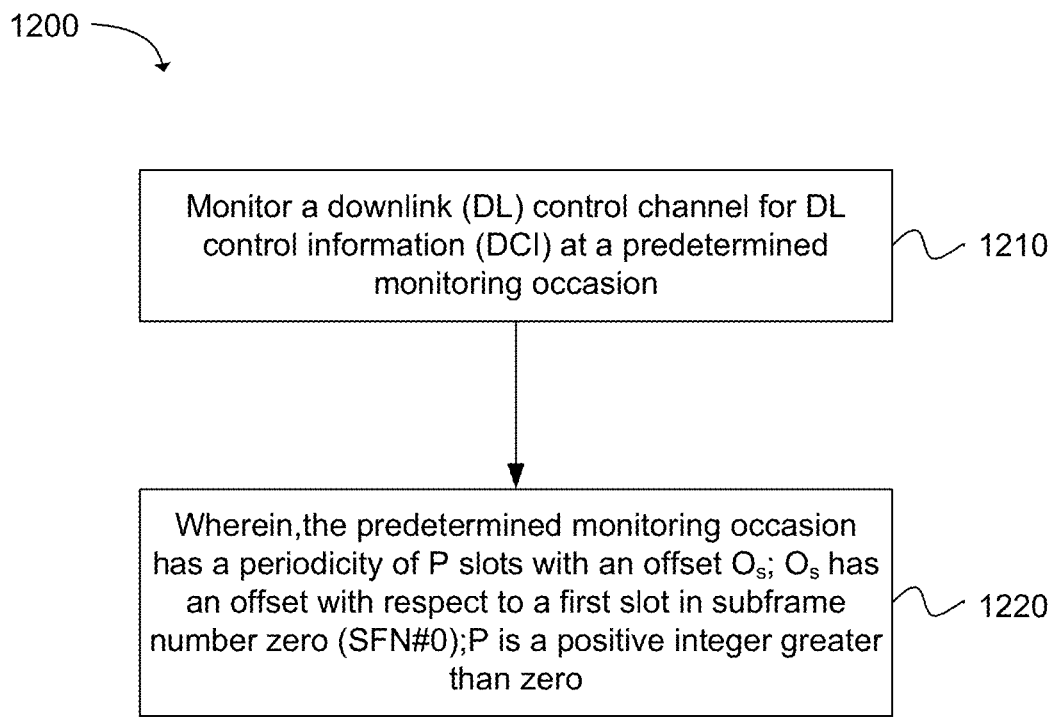
FIG. 12 depicts functionality of a user equipment (UE), operable for monitoring a physical downlink control channel (PDCCH), in accordance with an example.

FIG. 12 depicts functionality 1200 of a user equipment (UE), operable for monitoring a physical downlink control channel (PDCCH). The UE can comprise one or more processors configured to monitor a downlink (DL) control channel for DL control information (DCI) at a predetermined monitoring occasion 1210. The UE can comprise one or more processors configured to monitor a downlink (DL) control channel for DL control information (DCI) at a predetermined monitoring occasion, wherein the predetermined monitoring occasion has a periodicity of P slots or P symbols with an offset Os 1220. The UE can comprise one or more processors configured to monitor a downlink (DL) control channel for DL control information (DCI) at a predetermined monitoring occasion, wherein Os has an offset with respect to a first slot in subframe number zero (SFN #0) 1220. The UE can comprise one or more processors configured to monitor a downlink (DL) control channel for DL control information (DCI) at a predetermined monitoring occasion, wherein P is a positive integer greater than zero 1220.

In one embodiment, the one or more processors are further configured to monitor the DL control channel, wherein the DCI is offset by a selected number of symbols in the predetermined monitoring occasion to enable long term evolution (LTE) cell specific reference signal (CRS) to be included in the offset selected number of symbols to provide long term evolution (LTE)-new radio (NR) coexistence.

In one embodiment, the one or more processors are further configured to monitor the DL control channel, wherein the DCI is offset at a beginning of a slot by two symbols to enable the LTE CRS to be included in the two symbols when the UE is monitoring an LTE multicast-broadcast single-frequency network (MBSFN).

In one embodiment, the one or more processors are further configured to decode, a higher layer signal, the value of P and the value of $O_s$ is based on numerology of the PDCCH.

In one embodiment, the one or more processors are further configured to monitor a selected number of symbols in the monitoring occasion for a common search space (CSS) in a control resource set (CORESET) or a common CORESET.

In one embodiment, the one or more processors are further configured to monitor the DL control channel in the CSS in the CORESET or in the common CORESET with a minimum period between monitoring occasions of one slot duration.

In one embodiment, the one or more processors are further configured to monitor a selected number of symbols in the monitoring occasion for a UE-specific search space (USS) in a control resource set (CORESET).

In one embodiment, the one or more processors are further configured to monitor the DL control channel in the USS in the CORESET with a minimum period shorter than the monitoring occasions of one slot duration.

Figure 13:
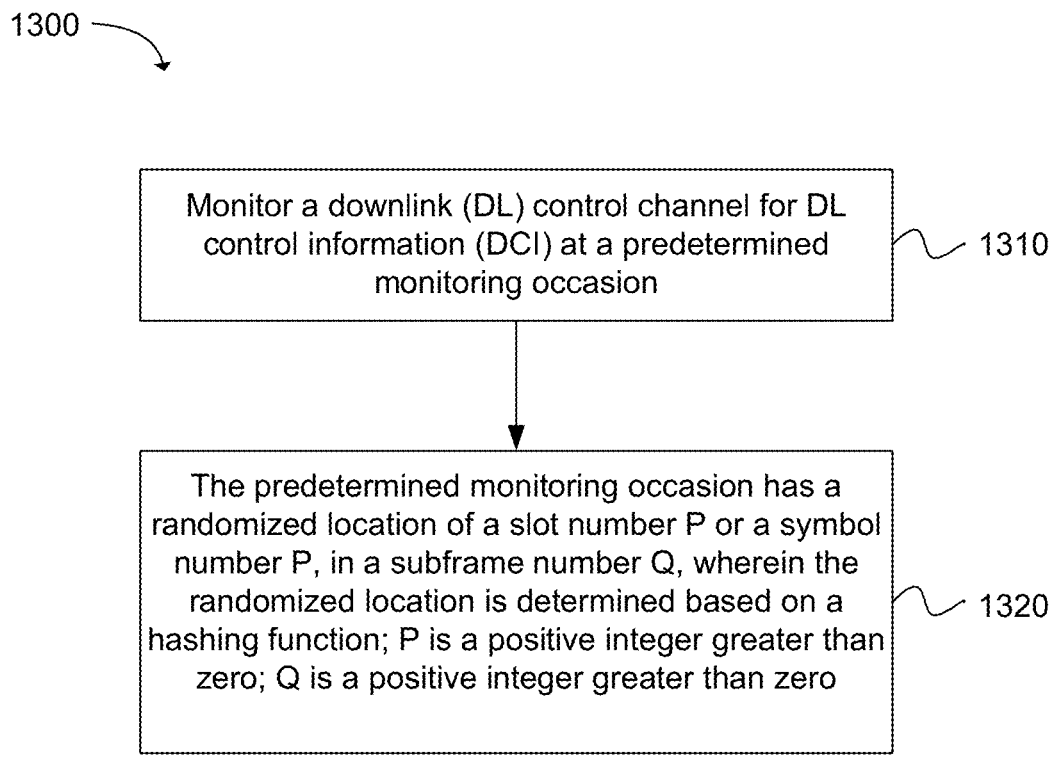
FIG. 13 depicts functionality of a user equipment (UE), operable for monitoring a physical downlink control channel (PDCCH), in accordance with an example.

FIG. 13 depicts functionality 1300 of a user equipment (UE), operable for monitoring a physical downlink control channel (PDCCH). The UE can comprise one or more processors configured to monitor a downlink (DL) control channel for DL control information (DCI) at a predetermined monitoring occasion 1310. The UE can comprise one or more processors configured to monitor a downlink (DL) control channel for DL control information (DCI) at a predetermined monitoring occasion wherein, the predetermined monitoring occasion has a randomized location of a slot number P or a symbol number P, in a subframe number Q, wherein the randomized location is determined based on a hashing function 1320. The UE can comprise one or more processors configured to monitor a downlink (DL) control channel for DL control information (DCI) at a predetermined monitoring occasion wherein P is a positive integer greater than zero. The UE can comprise one or more processors configured to monitor a downlink (DL) control channel for DL control information (DCI) at a predetermined monitoring occasion wherein Q is a positive integer greater than zero.

In one embodiment, the one or more processors are further configured to decode, from a higher layer signal, the value of P, and the value of Q.

In one embodiment, the one or more processors are further configured to determine the randomized location of the slot number using the hashing function, wherein a UE identification (ID) of the UE is used in conjunction with the integer P and the integer Q in the hashing function to determine the slot number.

In one embodiment, the one or more processors are further configured to monitor a selected number of symbols in a slot duration associated with the monitoring occasion for a control resource set (CORESET).

In one embodiment, the one or more processors are further configured to monitor the DL control channel in the USS in the CORESET with a minimum period between monitoring occasions of one slot duration.

In one embodiment, the one or more processors are further configured to determine the randomized location with a symbol number P of slot number Q when: (((Q×14+P)×UE_ID)×higher_layer_parameter1) mod higher_layer_parameter2=0; or (((Q×14+P)×UE_ID) mod higher_layer_parameter1) mod higher_layer_parameter2=0; wherein higher_layer_parameter1 and higher_layer_parameter2 are integers received in a higher layer signal, at the UE.

In one embodiment, the one or more processors are further configured to determine the randomized location with a slot number P of subframe number Q when: (((Q×10+P)×UE_ID)×higher_layer_parameter1) mod higher_layer_parameter2=0; or (((Q×10+P)×UE_ID) mod higher_layer_parameter1) mod higher_layer_parameter2=0; wherein higher_layer_parameter1 and higher_layer_parameter2 are integers received in a higher layer signal, at the UE.

Figure 14:
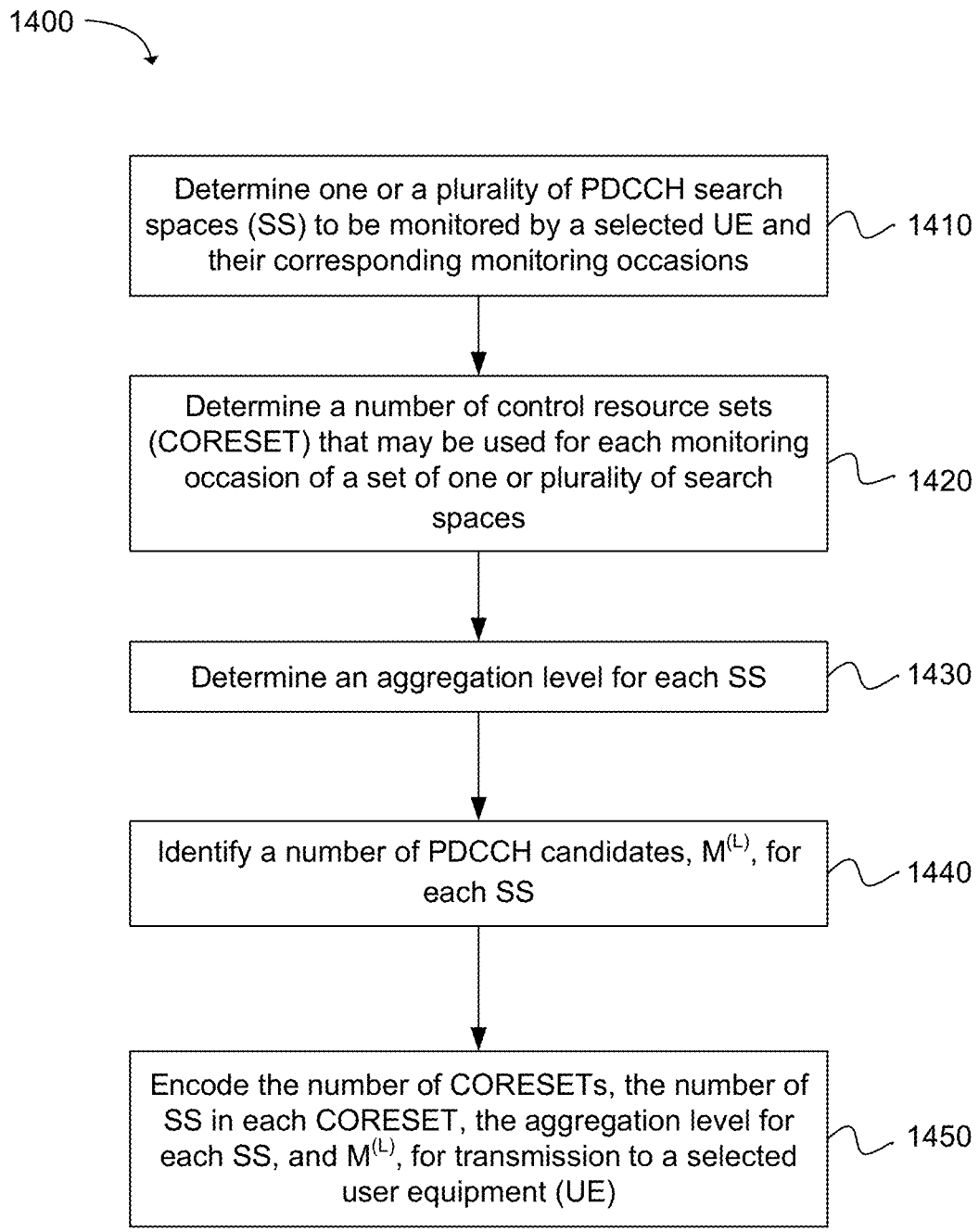
FIG. 14 depicts functionality of a next generation node B (gNB), operable to communicate on a physical downlink control channel (PDCCH), in accordance with an example.

FIG. 14 depicts functionality 1400 of a next generation node B (gNB), operable to communicate on a physical downlink control channel (PDCCH). The gNB can comprise one or more processors configured to determine one or a plurality of PDCCH search spaces (SS) to be monitored by a selected UE and their corresponding monitoring occasions 1410. The gNB can comprise one or more processors configured to determine a number of control resource sets (CORESET) that may be used for each monitoring occasion of a set of one or plurality of search spaces 1420. The gNB can comprise one or more processors configured to determine an aggregation level for each SS 1430. The gNB can comprise one or more processors configured to identify a number of PDCCH candidates, M(L), for each SS 1440. The gNB can comprise one or more processors configured to encode the number of CORESETs, the number of SS in each CORESET, the aggregation level for each SS, and M(L), for transmission to a selected user equipment (UE) 1450.

In one embodiment, the one or more processors are further configured to determine control channel elements (CCE) for a PDCCH candidate m of the number of PDCCH candidates $M^{(L)}$, wherein the CCEs are defined by: $L \cdot \{(Y_k+m) \bmod \lfloor N_{CCE,k}/L \rfloor\}+i$, wherein $Y_k$ is a starting CCE for k number of slots where k>0, i=0, L−1 and m=0, L, $M^{(L)}$−1.

In one embodiment, the one or more processors are further configured to encode a bitmap for transmission to the UE, wherein the bitmap is configured to indicate a number of SS that are configured in each CORESET.

In one embodiment, the one or more processors are further configured to encode the number of CORESETs, the number of SS in each CORESET, the aggregation level for each SS, and $M^{(L)}$, for transmission to a selected user equipment (UE) in a higher layer signal.

In one embodiment, $M^{(L)}$ is a number of candidates configured by higher layer signaling.

In one embodiment, the higher layer signal is transmitted via a new radio (NR) minimum system information (MSI), a NR remaining MSI (RMSI), a NR system information block (SIB), or a radio resource control (RRC) signal.

Figure 15:
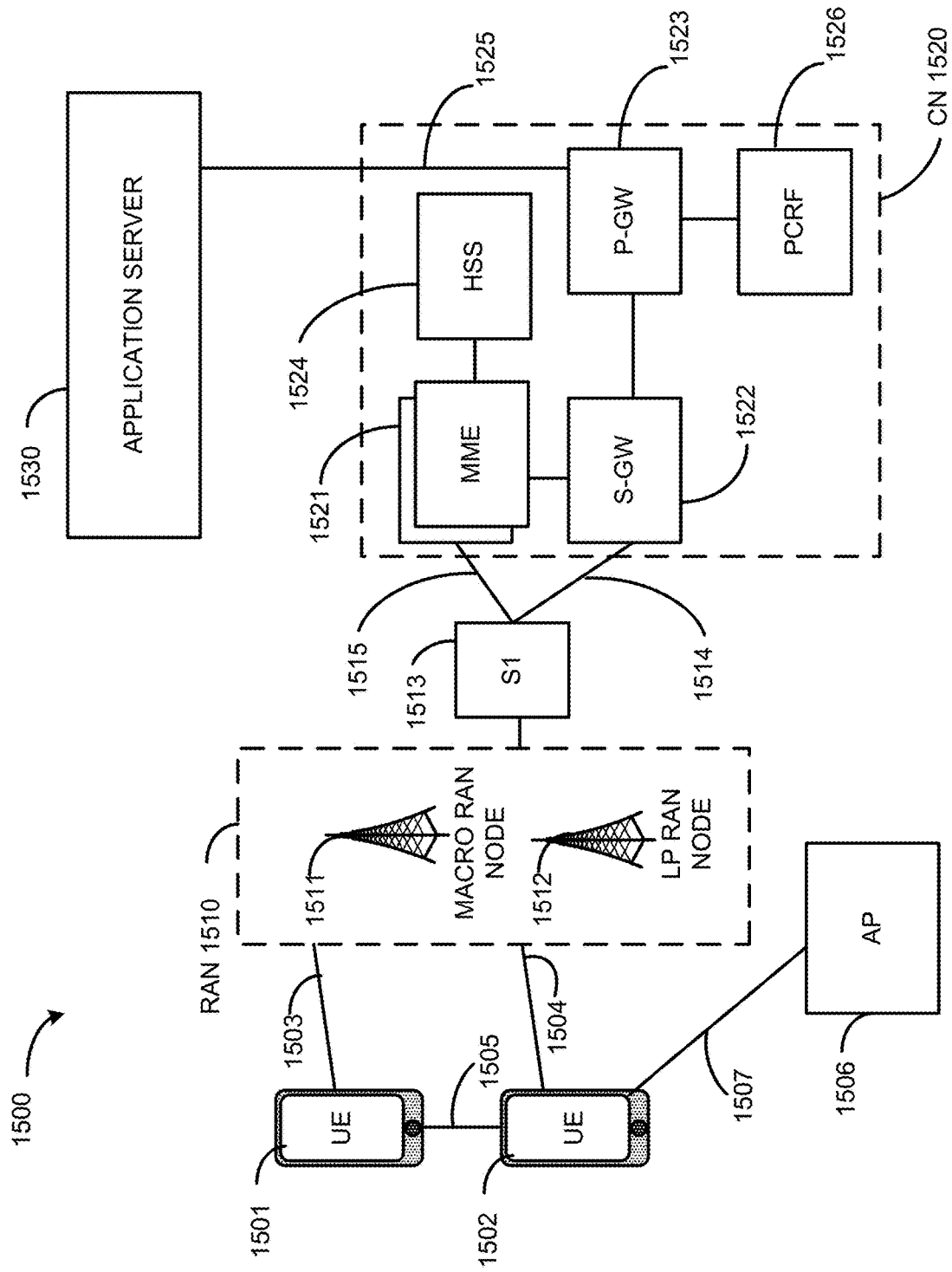
FIG. 15 illustrates an architecture of a network in accordance with an example.

FIG. 15 illustrates architecture of a system 1500 of a network in accordance with some embodiments. The system 1500 is shown to include a user equipment (UE) 1501 and a UE 1502. The UEs 1501 and 1502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1501 and 1502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1501 and 1502 may be configured to connect, e.g., communicatively couple, with a radio access network (RAN) 1510—the RAN 1510 may be, for example, an Evolved Universal Mobile Telecommunications System (UMTS) Terrestrial Radio Access Network (E-UTRAN), a Ne8Gen RAN (NG RAN), or some other type of RAN. The UEs 1501 and 1502 utilize connections 1503 and 1504, respectively, each of which comprises a physical communications interface or layer (discussed in further detail below); in this example, the connections 1503 and 1504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1501 and 1502 may further directly exchange communication data via a ProSe interface 1505. The ProSe interface 1505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1502 is shown to be configured to access an access point (AP) 1506 via connection 1507. The connection 1507 can comprise a local wireless connection, such as a connection consistent with any IEEE 802.11 protocol, wherein the AP 1506 would comprise a wireless fidelity (WiFi®) router. In this example, the AP 1506 is shown to be connected to the Internet without connecting to the core network of the wireless system (described in further detail below).

The RAN 1510 can include one or more access nodes that enable the connections 1503 and 1504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1510 may include one or more RAN nodes for providing macrocells, e.g., macro RAN node 1511, and one or more RAN nodes for providing femtocells or picocells (e.g., cells having smaller coverage areas, smaller user capacity, or higher bandwidth compared to macrocells), e.g., low power (LP) RAN node 1512.

Any of the RAN nodes 1511 and 1512 can terminate the air interface protocol and can be the first point of contact for the UEs 1501 and 1502. In some embodiments, any of the RAN nodes 1511 and 1512 can fulfill various logical functions for the RAN 1510 including, but not limited to, radio network controller (RNC) functions such as radio bearer management, uplink and downlink dynamic radio resource management and data packet scheduling, and mobility management.

In accordance with some embodiments, the UEs 1501 and 1502 can be configured to communicate using Orthogonal Frequency-Division Multiplexing (OFDM) communication signals with each other or with any of the RAN nodes 1511 and 1512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1511 and 1512 to the UEs 1501 and 1502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1501 and 1502. The physical downlink control channel (PDCCH) may carry information about the transport format and resource allocations related to the PDSCH channel, among other things. It may also inform the UEs 1501 and 1502 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1511 and 1512 based on channel quality information fed back from any of the UEs 1501 and 1502. The downlink resource assignment information may be sent on the PDCCH used for (e.g., assigned to) each of the UEs 1501 and 1502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e8ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1510 is shown to be communicatively coupled to a core network (CN) 1520—via an S1 interface 1513. In embodiments, the CN 1520 may be an evolved packet core (EPC) network, a Next Gen Packet Core (NPC) network, or some other type of CN. In this embodiment the S1 interface 1513 is split into two parts: the S1-U interface 1514, which carries traffic data between the RAN nodes 1511 and 1512 and the serving gateway (S-GW) 1522, and the S1-mobility management entity (MME) interface 1515, which is a signaling interface between the RAN nodes 1511 and 1512 and MMEs 1521.

In this embodiment, the CN 1520 comprises the MMEs 1521, the S-GW 1522, the Packet Data Network (PDN) Gateway (P-GW) 1523, and a home subscriber server (HSS)

1524. The MMEs 1521 may be similar in function to the control plane of legacy Serving General Packet Radio Service (GPRS) Support Nodes (SGSN). The MMEs 1521 may manage mobility aspects in access such as gateway selection and tracking area list management. The HSS 1524 may comprise a database for network users, including subscription-related information to support the network entities' handling of communication sessions. The CN 1520 may comprise one or several HSSs, depending on the number of mobile subscribers, on the capacity of the equipment, on the organization of the network, etc. For example, the HSS 1524 can provide support for routing/roaming, authentication, authorization, naming/addressing resolution, location dependencies, etc.

The S-GW 1522 may terminate the S1 interface 1513 towards the RAN 1510, and routes data packets between the RAN 1510 and the CN 1520. In addition, the S-GW 1522 may be a local mobility anchor point for inter-RAN node handovers and also may provide an anchor for inter-3GPP mobility. Other responsibilities may include lawful intercept, charging, and some policy enforcement.

The P-GW 1523 may terminate an SGi interface toward a PDN. The P-GW 1523 may route data packets between the CN 1520 and external networks such as a network including the application server 1530 (alternatively referred to as application function (AF)) via an Internet Protocol (IP) interface 1525. Generally, the application server 1530 may be an element offering applications that use IP bearer resources with the core network (e.g., UMTS Packet Services (PS) domain, LTE PS data services, etc.). In this embodiment, the P-GW 1523 is shown to be communicatively coupled to an application server 1530 via an IP communications interface 1525. The application server 1530 can also be configured to support one or more communication services (e.g., Voice-over-Internet Protocol (VoIP) sessions, PTT sessions, group communication sessions, social networking services, etc.) for the UEs 1501 and 1502 via the CN 1520.

The P-GW 1523 may further be a node for policy enforcement and charging data collection. Policy and Charging Enforcement Function (PCRF) 1526 is the policy and charging control element of the CN 1520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1526 may be communicatively coupled to the application server 1530 via the P-GW 1523. The application server 1530 may signal the PCRF 1526 to indicate a new service flow and select the appropriate Quality of Service (QoS) and charging parameters. The PCRF 1526 may provision this rule into a Policy and Charging Enforcement Function (PCEF) (not shown) with the appropriate traffic flow template (TFT) and QoS class of identifier (QCI), which commences the QoS and charging as specified by the application server 1530.

Figure 16:
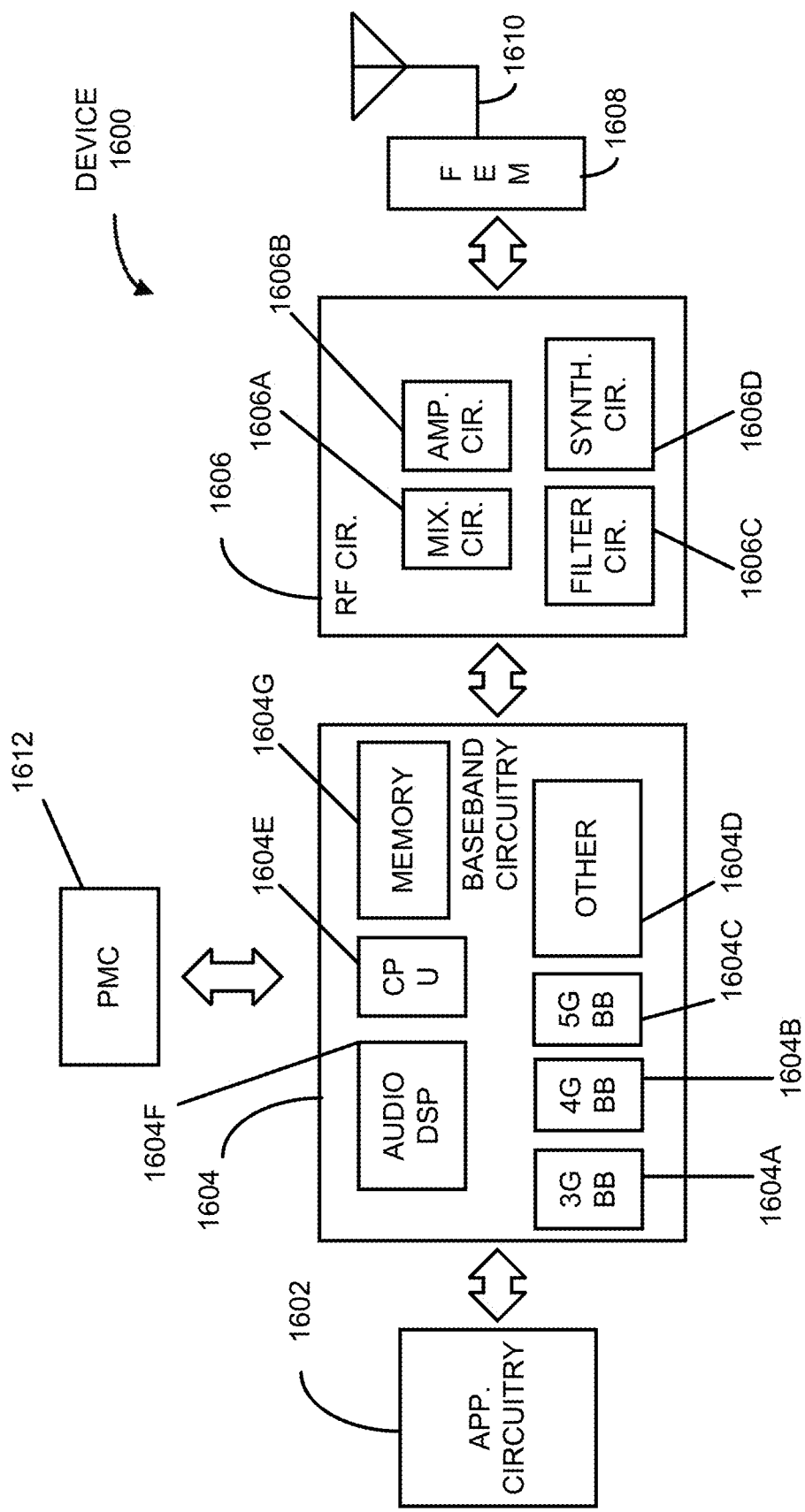
FIG. 16 illustrates a diagram of a wireless device (e.g., UE) and a base station (e.g., eNodeB) in accordance with an example.

FIG. 16 illustrates example components of a device 1600 in accordance with some embodiments. In some embodiments, the device 1600 may include application circuitry 1602, baseband circuitry 1604, Radio Frequency (RF) circuitry 1606, front-end module (FEM) circuitry 1608, one or more antennas 1610, and power management circuitry (PMC) 1612 coupled together at least as shown. The components of the illustrated device 1600 may be included in a UE or a RAN node. In some embodiments, the device 1600 may include less elements (e.g., a RAN node may not utilize application circuitry 1602, and instead include a processor/controller to process IP data received from an EPC). In some embodiments, the device 1600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1602 may include one or more application processors. For example, the application circuitry 1602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1600. In some embodiments, processors of application circuitry 1602 may process IP data packets received from an EPC.

The baseband circuitry 1604 may include circuitry such as, but not limited to, one or more single-core or multi-core processors. The baseband circuitry 1604 may include one or more baseband processors or control logic to process baseband signals received from a receive signal path of the RF circuitry 1606 and to generate baseband signals for a transmit signal path of the RF circuitry 1606. Baseband circuitry 1604 may interface with the application circuitry 1602 for generation and processing of the baseband signals and for controlling operations of the RF circuitry 1606. For example, in some embodiments, the baseband circuitry 1604 may include a third generation (3G) baseband processor 1604A, a fourth generation (4G) baseband processor 1604B, a fifth generation (5G) baseband processor 1604C, or other baseband processor(s) 1604D for other existing generations, generations in development or to be developed in the future (e.g., second generation (2G), sixth generation (6G), etc.). The baseband circuitry 1604 (e.g., one or more of baseband processors 1604A-D) may handle various radio control functions that enable communication with one or more radio networks via the RF circuitry 1606. In other embodiments, some or all of the functionality of baseband processors 1604A-D may be included in modules stored in the memory 1604G and executed via a Central Processing Unit (CPU) 1604E. The radio control functions may include, but are not limited to, signal modulation/demodulation, encoding/decoding, radio frequency shifting, etc. In some embodiments, modulation/demodulation circuitry of the baseband circuitry 1604 may include Fast-Fourier Transform (FFT), precoding, or constellation mapping/demapping functionality. In some embodiments, encoding/decoding circuitry of the baseband circuitry 1604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1604 may include one or more audio digital signal processor(s) (DSP) 1604F. The audio DSP(s) 1604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1604 and the application circuitry 1602 may be implemented together such as, for example, on a system on a chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path which may include circuitry to down-convert RF signals received from the FEM circuitry 1608 and provide baseband signals to the baseband circuitry 1604. RF circuitry 1606 may also include a transmit signal path which may include circuitry to up-convert baseband signals provided by the baseband circuitry 1604 and provide RF output signals to the FEM circuitry 1608 for transmission.

In some embodiments, the receive signal path of the RF circuitry 1606 may include mixer circuitry 1606a, amplifier circuitry 1606b and filter circuitry 1606c. In some embodiments, the transmit signal path of the RF circuitry 1606 may include filter circuitry 1606c and mixer circuitry 1606a. RF circuitry 1606 may also include synthesizer circuitry 1606d for synthesizing a frequency for use by the mixer circuitry 1606a of the receive signal path and the transmit signal path. In some embodiments, the mixer circuitry 1606a of the receive signal path may be configured to down-convert RF signals received from the FEM circuitry 1608 based on the synthesized frequency provided by synthesizer circuitry 1606d. The amplifier circuitry 1606b may be configured to amplify the down-converted signals and the filter circuitry 1606c may be a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may be zero-frequency baseband signals, although this is not a necessity. In some embodiments, mixer circuitry 1606a of the receive signal path may comprise passive mixers, although the scope of the embodiments is not limited in this respect.

In some embodiments, the mixer circuitry 1606a of the transmit signal path may be configured to up-convert input baseband signals based on the synthesized frequency provided by the synthesizer circuitry 1606d to generate RF output signals for the FEM circuitry 1608. The baseband signals may be provided by the baseband circuitry 1604 and may be filtered by filter circuitry 1606c.

In some embodiments, the mixer circuitry 1606a of the receive signal path and the mixer circuitry 1606a of the transmit signal path may include two or more mixers and may be arranged for quadrature downconversion and upconversion, respectively. In some embodiments, the mixer circuitry 1606a of the receive signal path and the mixer circuitry 1606a of the transmit signal path may include two or more mixers and may be arranged for image rejection (e.g., Hartley image rejection). In some embodiments, the mixer circuitry 1606a of the receive signal path and the mixer circuitry 1606a may be arranged for direct downconversion and direct upconversion, respectively. In some embodiments, the mixer circuitry 1606a of the receive signal path and the mixer circuitry 1606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606d may be a fractional-N synthesizer or a fractional N/N+1 synthesizer, although the scope of the embodiments is not limited in this respect as other types of frequency synthesizers may be suitable. For example, synthesizer circuitry 1606d may be a delta-sigma synthesizer, a frequency multiplier, or a synthesizer comprising a phase-locked loop with a frequency divider.

The synthesizer circuitry 1606d may be configured to synthesize an output frequency for use by the mixer circuitry 1606a of the RF circuitry 1606 based on a frequency input and a divider control input. In some embodiments, the synthesizer circuitry 1606d may be a fractional N/N+1 synthesizer.

In some embodiments, frequency input may be provided by a voltage controlled oscillator (VCO), although that is not a necessity. Divider control input may be provided by either the baseband circuitry 1604 or the application circuitry 1602 depending on the desired output frequency. In some embodiments, a divider control input (e.g., N) may be determined from a look-up table based on a channel indicated by the application circuitry 1602.

Synthesizer circuitry 1606d of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606d may be configured to generate a carrier frequency as the output frequency, while in other embodiments, the output frequency may be a multiple of the carrier frequency (e.g., twice the carrier frequency, four times the carrier frequency)

and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path which may include circuitry configured to operate on RF signals received from one or more antennas 1610, amplify the received signals and provide the amplified versions of the received signals to the RF circuitry 1606 for further processing. FEM circuitry 1608 may also include a transmit signal path which may include circuitry configured to amplify signals for transmission provided by the RF circuitry 1606 for transmission by one or more of the one or more antennas 1610. In various embodiments, the amplification through the transmit or receive signal paths may be done solely in the RF circuitry 1606, solely in the FEM circuitry 1608, or in both the RF circuitry 1606 and the FEM circuitry 1608.

In some embodiments, the FEM circuitry 1608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission (e.g., by one or more of the one or more antennas 1610).

In some embodiments, the PMC 1612 may manage power provided to the baseband circuitry 1604. In particular, the PMC 1612 may control power-source selection, voltage scaling, battery charging, or DC-to-DC conversion. The PMC 1612 may often be included when the device 1600 is capable of being powered by a battery, for example, when the device is included in a UE. The PMC 1612 may increase the power conversion efficiency while providing desirable implementation size and heat dissipation characteristics.

While FIG. 16 shows the PMC 1612 coupled only with the baseband circuitry 1604. However, in other embodiments, the PMC 1612 may be additionally or alternatively coupled with, and perform similar power management operations for, other components such as, but not limited to, application circuitry 802, RF circuitry 1606, or FEM circuitry 1608.

In some embodiments, the PMC 1612 may control, or otherwise be part of, various power saving mechanisms of the device 1600. For example, if the device 1600 is in an RRC_Connected state, where it is still connected to the RAN node as it expects to receive traffic shortly, then it may enter a state known as Discontinuous Reception Mode (DRX) after a period of inactivity. During this state, the device 1600 may power down for brief intervals of time and thus save power.

If there is no data traffic activity for an extended period of time, then the device 1600 may transition off to an RRC_Idle state, where it disconnects from the network and does not perform operations such as channel quality feedback, handover, etc. The device 1600 goes into a very low power state and it performs paging where again it periodically wakes up to listen to the network and then powers down again. The device 1600 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1602 and processors of the baseband circuitry 1604 may be used to execute elements of one or more instances of a protocol stack. For example, processors of the baseband circuitry 1604, alone or in combination, may be used execute Layer 3, Layer 2, or Layer 1 functionality, while processors of the application circuitry 1604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 17:
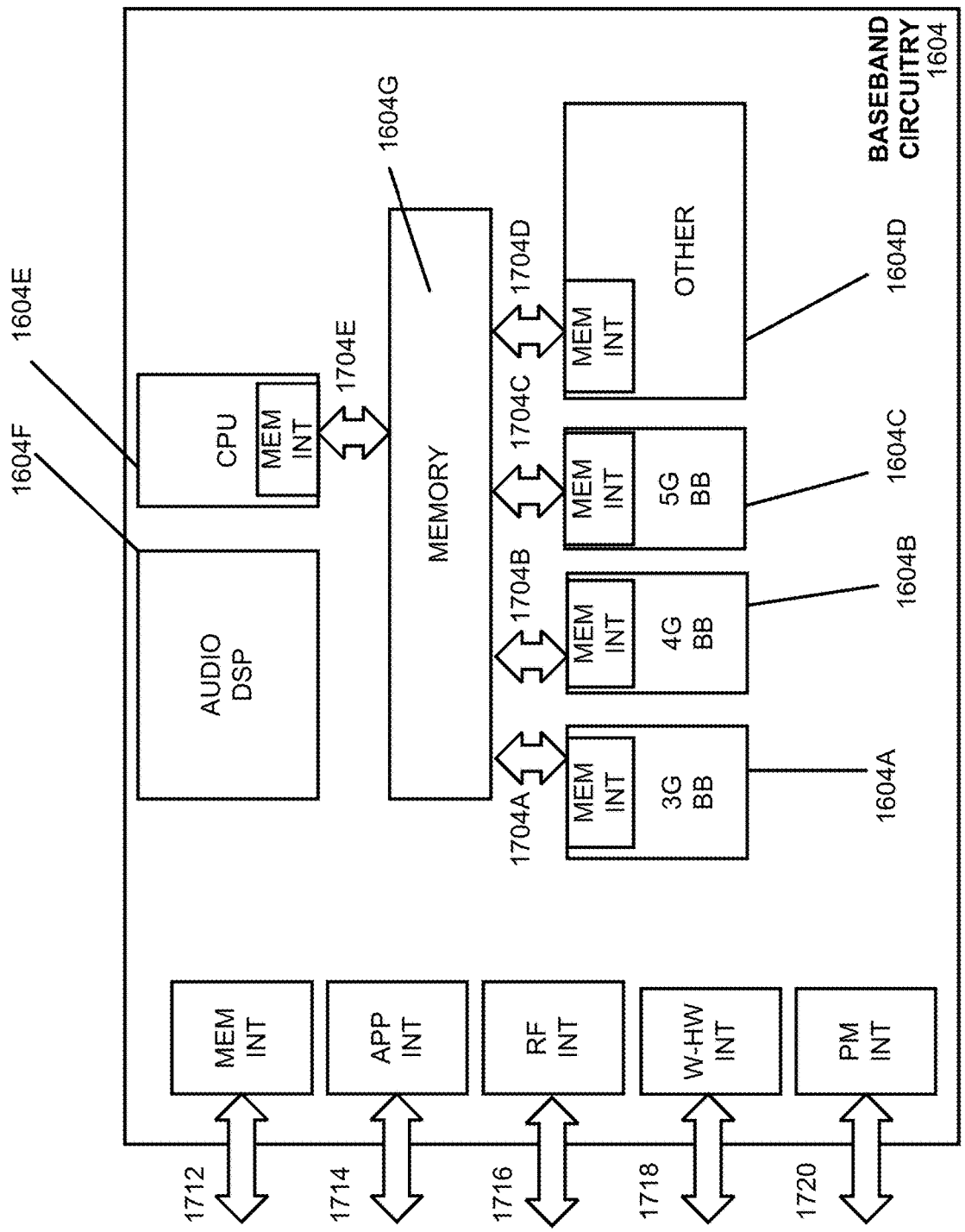
FIG. 17 illustrates example interfaces of baseband circuitry in accordance with an example.

FIG. 17 illustrates example interfaces of baseband circuitry in accordance with some embodiments. As discussed above, the baseband circuitry 1604 of FIG. 16 may comprise processors 1604A-1604E and a memory 1604G utilized by said processors. Each of the processors 1604A-1604E may include a memory interface, 1704A-1704E, respectively, to send/receive data to/from the memory 1604G.

The baseband circuitry 1604 may further include one or more interfaces to communicatively couple to other circuitries/devices, such as a memory interface 1712 (e.g., an interface to send/receive data to/from memory external to the baseband circuitry 1604), an application circuitry interface 1714 (e.g., an interface to send/receive data to/from the application circuitry 1602 of FIG. 16), an RF circuitry interface 1716 (e.g., an interface to send/receive data to/from RF circuitry 1606 of FIG. 16), a wireless hardware connectivity interface 1718 (e.g., an interface to send/receive data to/from Near Field Communication (NFC) components, Bluetooth® components (e.g., Bluetooth® Low Energy), Wi-Fi® components, and other communication components), and a power management interface 1720 (e.g., an interface to send/receive power or control signals to/from the PMC 1612.

Figure 18:
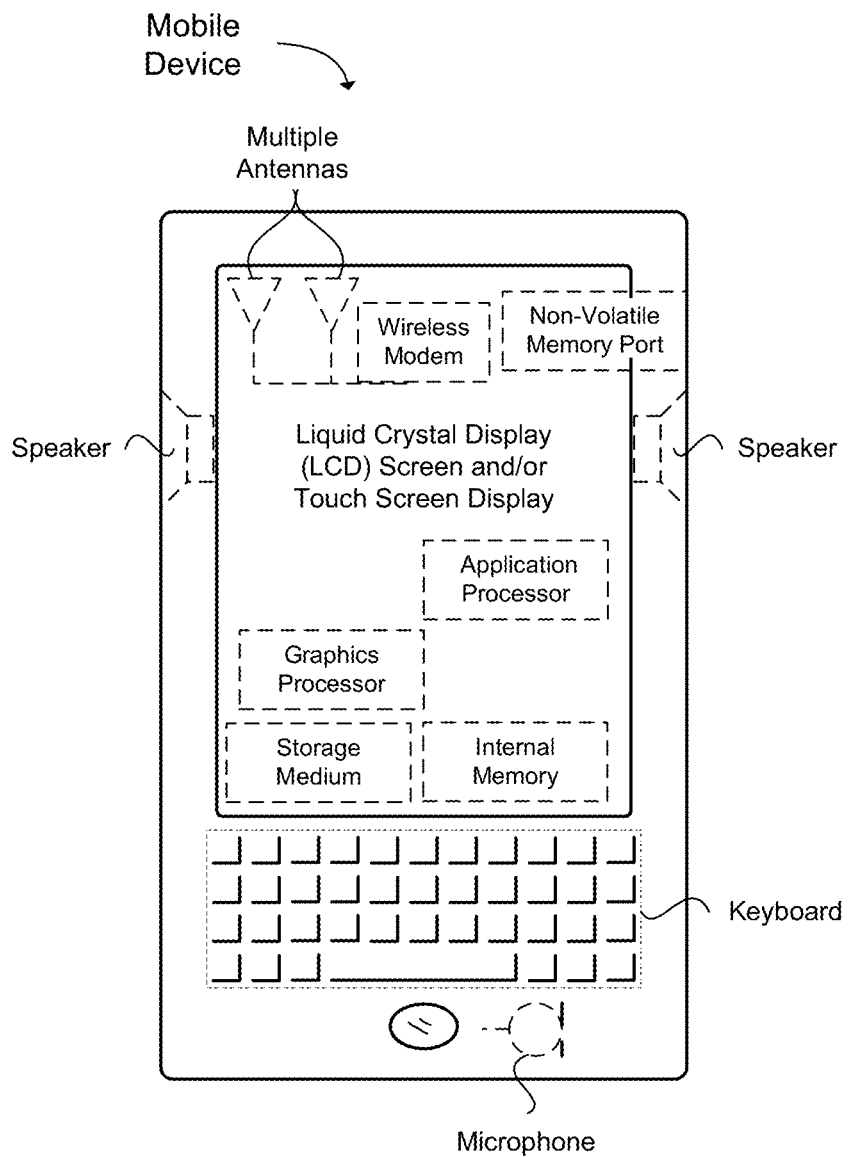
FIG. 18 illustrates a diagram of a wireless device (e.g., UE) in accordance with an example.

FIG. 18 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 18 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE), operable for monitoring a physical downlink control channel (PDCCH), the apparatus comprising: one or more processors configured to: monitor a downlink (DL) control channel for DL control information (DCI) at a predetermined monitoring occasion, wherein: the predetermined monitoring occasion has a periodicity of P slots with an offset Os slots; Os has an offset with respect to a first slot in subframe number zero (SFN #0); P is a positive integer greater than zero; a memory interface configured to store in a memory the periodicity, P.

Example 2 includes the apparatus of example 1, wherein the one or more processors are further configured to monitor the DL control channel, wherein the PDCCH monitoring occasion in a monitored slot is offset by a selected number of symbols with respect to the slot boundary.

Example 3 includes the apparatus of example 2, wherein the one or more processors are further configured to monitor the DL control channel, wherein the DCI is offset at a beginning of a slot by two symbols.

Example 4 includes the apparatus of example 1, wherein the one or more processors are further configured to decode, a higher layer signal, the value of P and the value of $O_s$ is based on a numerology of the PDCCH.

Example 5 includes the apparatus of example 1, wherein the one or more processors are further configured to monitor a selected number of symbols for PDCCH monitoring for a common search space (CSS) in a control resource set (CORESET) or common CORESET.

Example 6 includes the apparatus of example 5, wherein the one or more processors are further configured to monitor the DL control channel in the CSS in the CORESET or the common CORESET with a minimum period between monitoring occasions of one slot duration.

Example 7 includes the apparatus of example 1, wherein the one or more processors are further configured to monitor a selected number of symbols for PDCCH monitoring for a UE-specific search space (USS) in a control resource set (CORESET).

Example 8 includes the apparatus of example 7, wherein the one or more processors are further configured to monitor the DL control channel in the USS in the CORESET with a minimum period shorter than the monitoring occasions of one slot duration.

Example 9 includes an apparatus of a user equipment (UE), operable for monitoring a physical downlink control channel (PDCCH), the apparatus comprising: one or more processors configured to: monitor a downlink (DL) control channel for DL control information (DCI) at a predetermined monitoring occasion, wherein: the predetermined monitoring occasion has a randomized location of a slot number P or a symbol number P, in a subframe number Q, wherein the randomized location is determined based on a hashing function; P is a positive integer greater than zero; Q is a positive integer greater than zero; a memory interface configured to store in a memory the slot number P, or the symbol number P.

Example 10 includes the apparatus of example 9, wherein the one or more processors are further configured to decode, from a higher layer signal, the value of P, and the value of Q.

Example 11 includes the apparatus of example 10, wherein the one or more processors are further configured to determine the randomized location of the slot number using the hashing function, wherein a UE identification (ID) of the UE is used in conjunction with the integer P and the integer Q in the hashing function to determine the slot number.

Example 12 includes the apparatus of example 9, wherein the one or more processors are further configured to monitor a selected number of symbols in a slot duration associated with the monitoring occasion for a control resource set (CORESET).

Example 13 includes the apparatus of example 12, wherein the one or more processors are further configured to monitor the DL control channel in the USS in the CORESET with a minimum period between monitoring occasions of one slot duration.

Example 14 includes the apparatus of example 9, wherein the one or more processors are further configured to determine the randomized location with a symbol number P of slot number Q when: $(((Q \times 14 + P) \times UE\_ID) \times higher\_layer\_parameter1) \mod higher\_layer\_parameter2 = 0$; or $(((Q \times 14 + P) \times UE\_ID) \mod higher\_layer\_parameter1) \mod higher\_layer\_parameter2 = 0$; wherein higher_layer_parameter1 and higher_layer_parameter2 are integers received in a higher layer signal, at the UE.

Example 15 includes the apparatus of example 9, wherein the one or more processors are further configured to determine the randomized location with a slot number P of subframe number Q when: $(((Q \times 10 + P) \times UE\_ID) \times higher\_layer\_parameter1) \mod higher\_layer\_parameter2 = 0$; or $(((Q \times 10 + P) \times UE\_ID) \mod higher\_layer\_parameter1) \mod higher\_layer\_parameter2 = 0$; wherein higher_layer_parameter1 and higher_layer_parameter2 are integers received in a higher layer signal, at the UE.

Example 16 includes an apparatus of a next generation node B (gNB), operable to communicate on a physical downlink control channel (PDCCH), the apparatus comprising: one or more processors configured to: determine one or a plurality of PDCCH search spaces (SS) to be monitored by a selected UE and their corresponding monitoring occasions; determine a number of control resource sets (CORESET) that may be used for each monitoring occasion of a set of one or plurality of search spaces; determine an aggregation level for each SS; identify a number of PDCCH candidates, $M^{(L)}$, for each SS; encode the number of CORESETs, the number of SS in each CORESET, the aggregation level for each SS, and $M^{(L)}$, for transmission to a selected user equipment (UE); and a memory interface configured to store in a memory the number of CORESETs for the UE.

Example 17 includes the apparatus of example 16, wherein the one or more processors are further configured to determine control channel elements (CCE) for a PDCCH candidate m of the number of PDCCH candidates $M^{(L)}$, wherein the CCEs are defined by: $L \cdot \{(Y_k + m) \bmod \lfloor N_{CCE,k}/L \rfloor\} + i$, wherein $Y_k$ is a starting CCE for k number of slots within a frame where k>0, i=0, L, L−1 and m=0, L, $M^{(L)}$−1.

Example 18 includes the apparatus of example 16, wherein the one or more processors are further configured to: encode a bitmap for transmission to the UE, wherein the bitmap is configured to indicate a number of SS that are configured in each CORESET.

Example 19 includes the apparatus of example 16, wherein the one or more processors are further configured to: encode the number of CORESETs, the number of SS in each CORESET, the aggregation level for each SS, and $M^{(L)}$, for transmission to a selected user equipment (UE) in a higher layer signal.

Example 20 includes the apparatus of example 16, wherein $M^{(L)}$ is a number of candidates configured by higher layer signaling.

Example 21 includes the apparatus of example 19, wherein the higher layer signal is transmitted via a new radio (NR) minimum system information (MSI), a NR remaining MSI (RMSI), a NR system information block (SIB), or a radio resource control (RRC) signal.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A method of a user equipment (UE), comprising:
   receiving, from a base station:
   a number of control resource sets (CORESETs) that may be used for each monitoring occasion of a set of one or a plurality of search spaces (SS),
   a number of SS in each CORESET,
   an aggregation level for each SS, and
   a number of physical downlink control channel (PDCCH) candidates, $M^{(L)}$, for each SS; and
   performing PDCCH monitoring based on the number of CORESETs, the number of SS in each CORESET, the aggregation level for each SS, and the $M^{(L)}$.

2. The method of claim 1, wherein the number of CORESETs, the number of SS in each CORESET, the aggregation level for each SS, and the $M^{(L)}$ are received in a higher layer signal.

3. The method of claim 2, wherein the higher layer signal is received via a new radio (NR) minimum system information (MSI), a NR remaining MSI (RMSI), or a NR system information block (SIB).

4. The method of claim 1, wherein the $M^{(L)}$ is a number of candidates configured by higher layer signaling.

5. The method of claim 4, wherein the higher layer signaling comprises a radio resource control (RRC) signal.

6. The method of claim 1, further comprising receiving, from the base station, a bitmap that indicates the number of SS in each CORESET.

7. An apparatus of a user equipment (UE), comprising:
   one or more processors; and
   a memory storing instructions that, when executed by the one or more processors, configure the UE to:
   receive, from a base station:
   a number of control resource sets (CORESETs) that may be used for each monitoring occasion of a set of one or a plurality of search spaces (SS),
   a number of SS in each CORESET,
   an aggregation level for each SS, and
   a number of physical downlink control channel (PDCCH) candidates, $M^{(L)}$, for each SS; and
   perform PDCCH monitoring based on the number of CORESETs, the number of SS in each CORESET, the aggregation level for each SS, and the $M^{(L)}$.

8. The apparatus of claim 7, wherein the number of CORESETs, the number of SS in each CORESET, the aggregation level for each SS, and the $M^{(L)}$ are received in a higher layer signal.

9. The apparatus of claim 8, wherein the higher layer signal is received via a new radio (NR) minimum system information (MSI), a NR remaining MSI (RMSI), or a NR system information block (SIB).

10. The apparatus of claim 7, wherein the $M^{(L)}$ is a number of candidates configured by higher layer signaling.

11. The apparatus of claim 10, wherein the higher layer signaling comprises a radio resource control (RRC) signal.

12. The apparatus of claim 7, wherein the instructions, when executed by the one or more processors, further configure the UE to receive, from the base station, a bitmap that indicates the number of SS in each CORESET.

13. A non-transitory computer-readable storage medium comprising instructions that, when executed by one or more processors of a user equipment (UE), cause the UE to:
   receive, from a base station:
   a number of control resource sets (CORESETs) that may be used for each monitoring occasion of a set of one or a plurality of search spaces (SS),
   a number of SS in each CORESET,
   an aggregation level for each SS, and
   a number of physical downlink control channel (PDCCH) candidates, $M^{(L)}$, for each SS; and
   perform PDCCH monitoring based on the number of CORESETs, the number of SS in each CORESET, the aggregation level for each SS, and the $M^{(L)}$.

14. The non-transitory computer-readable storage medium of claim 13, wherein the number of CORESETs, the number of SS in each CORESET, the aggregation level for each SS, and the $M^{(L)}$ are received in a higher layer signal.

15. The non-transitory computer-readable storage medium of claim 14, wherein the higher layer signal is received via a new radio (NR) minimum system information (MSI), a NR remaining MSI (RMSI), or a NR system information block (SIB).

16. The non-transitory computer-readable storage medium of claim 13, wherein the $M^{(L)}$ is a number of candidates configured by higher layer signaling.

17. The non-transitory computer-readable storage medium of claim 16, wherein the higher layer signaling comprises a radio resource control (RRC) signal.

18. The non-transitory computer-readable storage medium of claim 13, wherein the instructions, when executed by the one or more processors, further cause the UE to receive, from the base station, a bitmap that indicates the number of SS in each CORESET.

* * * * *